(12) United States Patent
Kosek et al.

(10) Patent No.: US 10,329,104 B2
(45) Date of Patent: Jun. 25, 2019

(54) VEHICLE RESTRAINT

(71) Applicant: ASSA ABLOY Entrance Systems AB, Landskrona (SE)

(72) Inventors: Stephen Kosek, Fort Worth, TX (US); Michael Story, Denton, TX (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 85 days.

(21) Appl. No.: 15/466,006

(22) Filed: Mar. 22, 2017

(65) Prior Publication Data

US 2018/0273310 A1    Sep. 27, 2018

Related U.S. Application Data

(60) Provisional application No. 62/495,598, filed on Apr. 4, 2016.

(51) Int. Cl.
*B65G 69/00* (2006.01)

(52) U.S. Cl.
CPC ................... *B65G 69/003* (2013.01)

(58) Field of Classification Search
CPC .................................................. B65G 69/003
USPC ........................................................ 414/401
See application file for complete search history.

(56) References Cited

U.S. PATENT DOCUMENTS

| | | |
|---|---|---|
| 2,801,011 A | 7/1957 | Overlach et al. |
| 3,305,049 A | 2/1967 | Willey |
| 4,207,019 A | 6/1980 | Cone |
| 4,208,161 A | 6/1980 | Hipp et al. |
| 4,264,259 A | 4/1981 | Hipp et al. |
| 4,282,621 A | 8/1981 | Anthony et al. |
| 4,400,127 A | 8/1983 | Metz |
| 4,443,150 A | 4/1984 | Hahn et al. |
| 4,472,099 A | 9/1984 | Hipp et al. |

(Continued)

FOREIGN PATENT DOCUMENTS

| | | |
|---|---|---|
| CA | 2234974 | 10/1999 |
| CA | 2297384 | 2/2001 |

(Continued)

OTHER PUBLICATIONS

Automatic Wheel Restraint Surface Mounted User's Manual, Apr. 2006, SPX Dock Products, Inc., 44 pages.

(Continued)

*Primary Examiner* — James Keenan
(74) *Attorney, Agent, or Firm* — Perkins Coie LLP

(57) ABSTRACT

Vehicle restraints for use at loading docks are disclosed herein. In some embodiments, a vehicle restraint can include a frame mountable relative to a loading dock face, a restraining structure configured to engage, for example, a Rear Impact Guard (RIG) of a shipping vehicle, and a linkage operably coupling the restraining structure to the frame. The linkage can include a collapsible strut operably coupled between the frame and the restraining structure. In operation, the linkage can be raised to engage the restraining structure with the RIG and prevent the vehicle from moving away from the dock face. Additionally, the restraining structure can be disengaged from the RIG by collapsing the strut, even if the RIG is imparting a significant load on the restraining structure that might otherwise bind the restraining structure in the engaged position.

20 Claims, 20 Drawing Sheets

(56) References Cited

U.S. PATENT DOCUMENTS

| | | |
|---|---|---|
| 4,555,211 A | 11/1985 | Metz |
| 4,560,315 A | 12/1985 | Hahn |
| 4,605,353 A | 8/1986 | Olson et al. |
| 4,634,334 A | 1/1987 | Hahn et al. |
| 4,664,582 A | 5/1987 | Edmeads et al. |
| 4,674,941 A | 6/1987 | Hageman et al. |
| 4,679,974 A | 7/1987 | Blunden |
| 4,695,216 A | 9/1987 | Erlandsson et al. |
| 4,784,567 A | 11/1988 | Hageman et al. |
| 4,815,918 A | 3/1989 | Bennett et al. |
| RE32,968 E | 6/1989 | Hahn |
| 4,861,217 A | 8/1989 | Erlandsson |
| 4,865,508 A | 9/1989 | Carlson et al. |
| 4,938,647 A | 7/1990 | Erlandsson et al. |
| 4,969,792 A | 11/1990 | Ellis et al. |
| 4,973,213 A | 11/1990 | Erlandsson et al. |
| 4,988,254 A | 1/1991 | Alexander |
| 5,026,242 A | 6/1991 | Alexander |
| 5,071,306 A | 12/1991 | Alexander |
| 5,096,359 A | 3/1992 | Alexander |
| 5,120,181 A | 6/1992 | Alexander |
| 5,212,846 A | 5/1993 | Hahn et al. |
| 5,249,905 A | 10/1993 | Warner et al. |
| 5,259,718 A | 11/1993 | Alexander |
| 5,297,921 A | 3/1994 | Springer et al. |
| 5,336,033 A | 8/1994 | Alexander |
| 5,346,353 A | 9/1994 | Alexander |
| 5,375,965 A | 12/1994 | Springer et al. |
| 5,454,682 A | 10/1995 | Alexander |
| 5,505,575 A | 4/1996 | Alexander |
| 5,531,557 A | 7/1996 | Springer |
| 5,553,987 A | 9/1996 | Ellis |
| 5,582,498 A | 12/1996 | Springer et al. |
| 5,664,930 A | 9/1997 | Ellis |
| 5,683,219 A | 11/1997 | Gilles et al. |
| 5,709,518 A | 1/1998 | Alexander et al. |
| 5,743,697 A | 4/1998 | Alexander |
| 5,762,459 A | 6/1998 | Springer et al. |
| 5,896,957 A | 4/1999 | Berends et al. |
| 5,927,928 A | 7/1999 | Hageman et al. |
| 5,934,857 A | 8/1999 | Alexander |
| 5,964,572 A | 10/1999 | Hahn et al. |
| 6,062,796 A | 5/2000 | Alexander |
| 6,082,952 A | 7/2000 | Alexander |
| 6,092,970 A | 7/2000 | Hahn et al. |
| 6,123,496 A | 9/2000 | Alexander |
| 6,139,242 A * | 10/2000 | Alexander ............ B65G 69/003 414/401 |
| 6,238,163 B1 | 5/2001 | Springer et al. |
| 6,250,432 B1 | 6/2001 | Hageman et al. |
| 6,276,496 B1 | 8/2001 | Hageman et al. |
| 6,322,311 B1 | 11/2001 | Alexander et al. |
| 6,336,527 B1 | 1/2002 | Metz et al. |
| RE37,570 E | 3/2002 | Springer et al. |
| 6,357,987 B1 | 3/2002 | Palus |
| 6,368,043 B1 | 4/2002 | Leum et al. |
| 6,371,253 B1 | 4/2002 | Berends et al. |
| 6,390,245 B1 | 5/2002 | Metz et al. |
| 6,478,525 B2 | 11/2002 | Hageman et al. |
| 6,505,713 B1 | 1/2003 | Paul et al. |
| 6,524,053 B2 | 2/2003 | Hahn et al. |
| 6,589,003 B2 | 7/2003 | Berends |
| 6,676,360 B2 | 1/2004 | Springer et al. |
| 6,690,287 B2 | 2/2004 | Jette et al. |
| 7,032,720 B2 | 4/2006 | Jette et al. |
| 7,056,077 B2 * | 6/2006 | Pedersen ............ B65G 69/003 414/401 |
| 7,226,265 B2 | 6/2007 | Wilson |
| 7,264,092 B2 | 9/2007 | Jette |
| 7,864,030 B2 | 1/2011 | Jetté et al. |
| 8,286,757 B2 | 10/2012 | Nelson et al. |
| 8,287,223 B2 | 10/2012 | Andersen et al. |
| 8,307,956 B2 | 11/2012 | Andersen et al. |
| 8,499,897 B2 | 8/2013 | Brooks et al. |
| 8,528,929 B2 | 9/2013 | Kimener |
| 8,529,183 B2 * | 9/2013 | Ion ................ B65G 69/003 414/401 |
| 8,532,816 B2 | 9/2013 | Ion |
| 8,590,674 B2 | 11/2013 | Jette et al. |
| 8,596,949 B2 | 12/2013 | Harrington et al. |
| 8,678,736 B2 | 3/2014 | Andersen et al. |
| 8,905,198 B2 | 12/2014 | Cotton et al. |
| 9,126,775 B2 | 9/2015 | Brooks et al. |
| 9,139,384 B2 | 9/2015 | Brooks, IV et al. |
| 9,145,273 B2 | 9/2015 | Brooks et al. |
| 9,694,790 B2 | 7/2017 | Kimener |
| 9,751,702 B1 | 9/2017 | Hoofard et al. |
| 2002/0136620 A1 | 9/2002 | Berends |
| 2002/0141852 A1 | 10/2002 | Hahn et al. |
| 2003/0159892 A1 | 8/2003 | Jette |
| 2003/0170097 A1 | 9/2003 | Pedersen et al. |
| 2004/0005210 A1 | 1/2004 | Alexander et al. |
| 2005/0133315 A1 | 6/2005 | Hoofard |
| 2005/0226705 A1 | 10/2005 | Wilson |
| 2006/0051196 A1 | 3/2006 | McDonald |
| 2006/0136782 A1 | 6/2006 | Corniot |
| 2006/0144649 A1 | 7/2006 | Jette |
| 2006/0182559 A1 | 8/2006 | Gleason et al. |
| 2007/0248440 A1 | 10/2007 | Andersen et al. |
| 2008/0124203 A1 | 5/2008 | McDonald |
| 2009/0026022 A1 | 1/2009 | Andersen et al. |
| 2009/0155030 A1 | 6/2009 | Andersen et al. |
| 2009/0194375 A1 | 8/2009 | Andersen et al. |
| 2009/0194376 A1 | 8/2009 | Brooks et al. |
| 2009/0223764 A1 | 9/2009 | Andersen et al. |
| 2010/0260585 A1 | 10/2010 | Sander et al. |
| 2010/0260586 A1 | 10/2010 | Manone et al. |
| 2011/0158778 A1 | 6/2011 | Harrington et al. |
| 2011/0162916 A1 | 7/2011 | Salinger et al. |
| 2011/0176896 A1 | 7/2011 | Andersen et al. |
| 2012/0006632 A1 | 1/2012 | Nelson |
| 2012/0234087 A1 | 9/2012 | Strahan et al. |
| 2013/0292214 A1 | 11/2013 | Brooks et al. |
| 2014/0255134 A1 | 9/2014 | Brooks, IV et al. |
| 2015/0191319 A1 | 7/2015 | Muhl et al. |
| 2015/0239686 A1 | 8/2015 | Stone et al. |
| 2016/0090072 A1 | 3/2016 | Eppley et al. |

FOREIGN PATENT DOCUMENTS

| | | |
|---|---|---|
| DE | 4120035 | 12/1992 |
| DE | 4427406 | 10/1995 |
| EP | 0452519 | 10/1991 |
| EP | 0609049 | 8/1994 |
| EP | 0684915 | 12/1995 |
| EP | 0775653 | 5/1997 |
| EP | 1112950 | 7/2001 |
| EP | 1764275 | 3/2007 |
| EP | 2170663 | 4/2010 |
| EP | 2796395 A1 | 10/2014 |
| FR | 2736336 | 1/1997 |
| WO | 9518029 | 7/1995 |
| WO | 199935067 | 7/1999 |
| WO | 2004078618 | 9/2004 |
| WO | 2009032372 | 3/2009 |
| WO | 2009100146 | 8/2009 |
| WO | 20090100146 | 8/2009 |
| WO | 2009111244 | 9/2009 |
| WO | 20090139946 | 11/2009 |
| WO | 2010090884 | 8/2010 |
| WO | 2010118032 | 10/2010 |
| WO | 2014137874 A1 | 9/2014 |
| WO | 2015077893 A1 | 6/2015 |

OTHER PUBLICATIONS

Vehicle Restraints, Safety Chock Series SLSC 2000, User's Manual, Sep. 1999, SERCO, 32 pages.

* cited by examiner

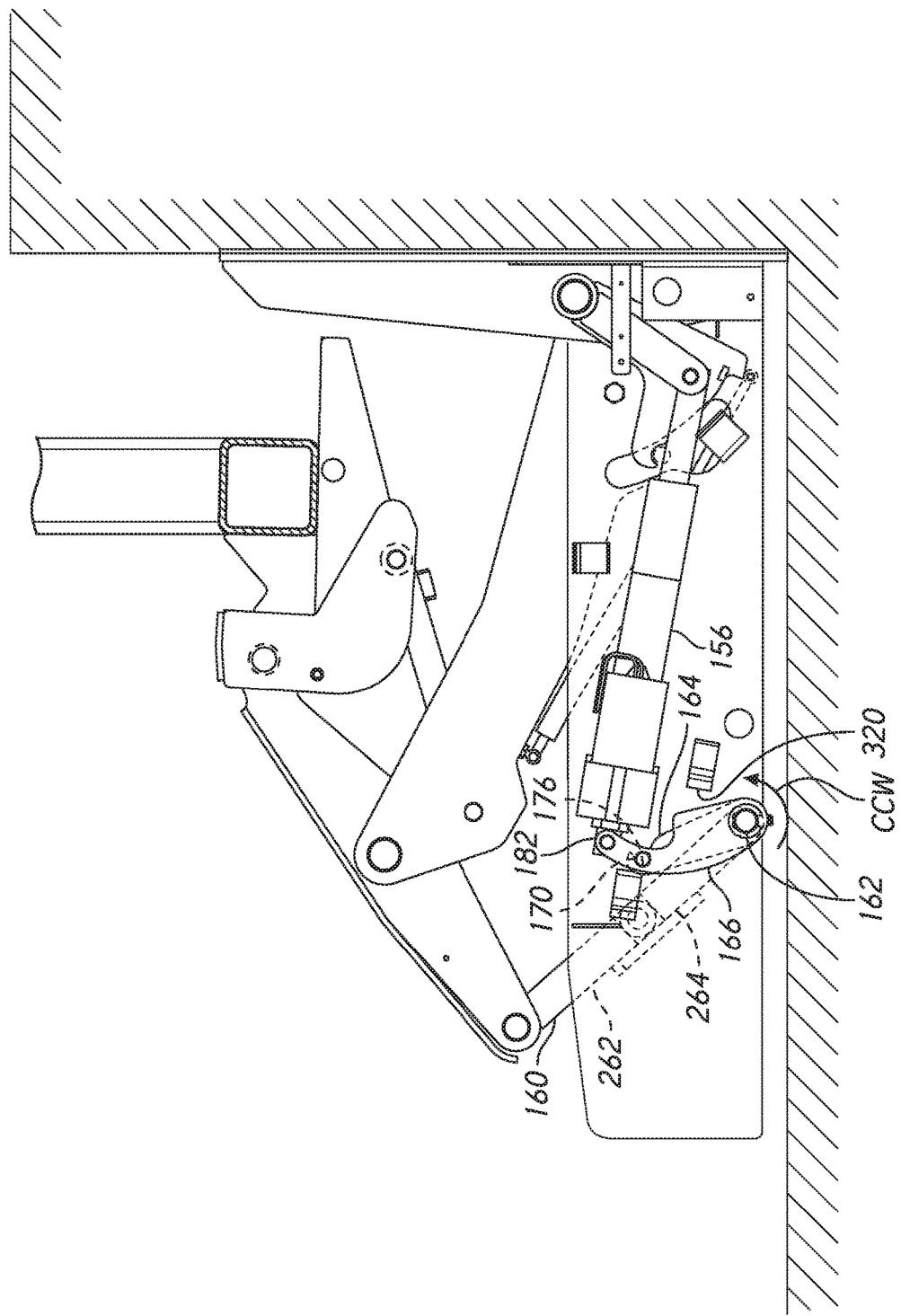

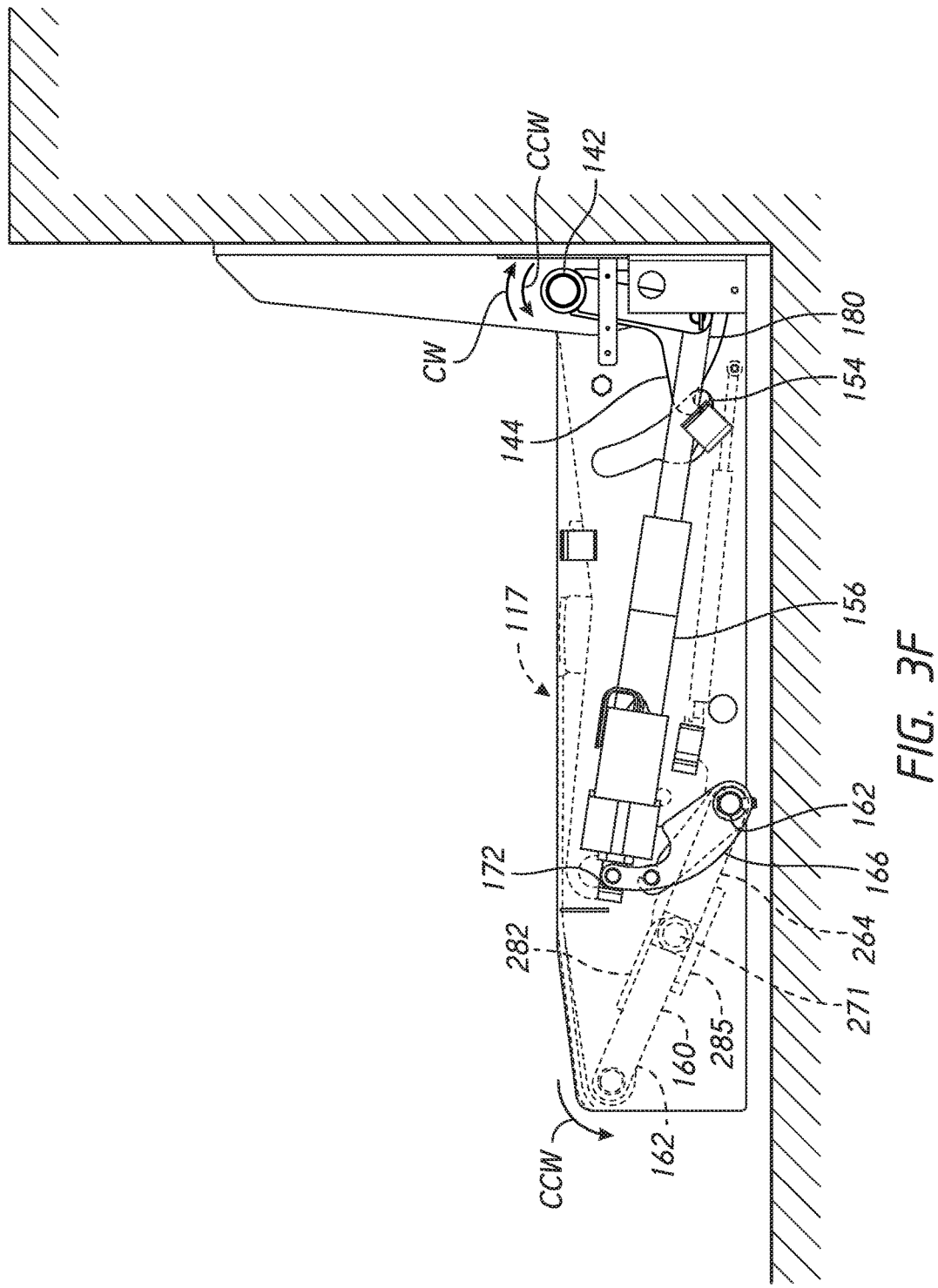

VEHICLE RESTRAINT

CROSS-REFERENCE TO APPLICATION INCORPORATED BY REFERENCE

This application claims priority to and the benefit of U.S. Provisional Patent Application No. 62/495,598, filed Apr. 4, 2016 and titled VEHICLE RESTRAINT, which is incorporated herein by reference in its entirety.

TECHNICAL FIELD

The following disclosure relates generally to vehicle restraints and, more particularly, to vehicle restraints for restraining transport trucks, trailers, and/or other vehicles at loading docks.

BACKGROUND

Vehicle restraints are used in the material handling industry to prevent vehicles from moving away from a loading dock while the vehicle is being loaded and/or unloaded with goods or materials. In general, these devices act as substitutes for wheel chocks. But unlike wheel chocks, conventional vehicle restraints typically engage the Rear Impact Guard ("RIG") bar of the vehicle. RIG bars (which can also be referred to as "ICC" bars) are horizontal members that extend across the rear end of the vehicle. In the U.S., regulations require that the vertical distance between the bottom edge of the RIG bar and the ground not exceed 22 inches at any point across the full width of the member, and that the rearmost surface of the RIG bar be within 12 inches of the rear extremity of the vehicle.

Trailers and other transport vehicles tend to "float" up and down as they are loaded and/or unloaded at loading docks. More specifically, as weight is moved off and on the vehicle it moves up and down, respectively, thereby varying the vertical position of the RIG bar relative to the ground. Some restraint systems have been developed to accommodate this vehicle movement, and they generally fall into three categories. The first category employs a restraining member operably coupled to a carriage having rollers or similar devices which ride on tracks mounted to the face of the loading dock. See, for example, the vehicle restraints disclosed in U.S. Pat. Nos. 4,472,099, 4,443,150, 4,282,621, 4,264,259 and 4,695,216, each of which is incorporated herein by reference in its entirety. The use of a vertically moving carriage provides a range of motion to engage RIG bars at different heights. However, the carriage rollers are subjected to vehicle restraint loads while moving up and down in response to vehicle loading and unloading. As a result, this type of restraint generally requires relatively high maintenance to service the moving carriage and related parts. Additionally, some of these vehicle restraints are designed to operate in response to vehicle impact. More specifically, to operate the restraint the vehicle backs into the loading dock until the RIG contacts the restraint system, causing the restraint system to move a locking hook into engagement with the RIG bar. The repeated shock of the RIG bar on such systems can cause significant component wear. Additionally, because the carriage track is mounted to the dock face, in some situations it may interfere with operation of the dock leveler, particularly on relatively low loading docks.

A second category of restraint system includes a vertical bar or similar restraining member that is moved into position in front of the RIG bar to prevent forward movement of the vehicle away from the loading dock. Various types of mechanisms have been proposed to position the bar in such systems, such as those disclosed in, for example, U.S. Pat. Nos. 4,634,334, 4,605,353, and 4,784,567, each of which is incorporated herein by reference in its entirety. In particular, some of these restraint systems pivot the bar into the vertical position to restrain the vehicle. One shortcoming of this type of system, however, is that the raised height of the bar is constant and, as a result, it may interfere with hitches and/or other equipment mounted to the underside of the vehicle.

A third category of restraint system utilizes one or more hooks which pivot about a fixed hinge mounted to the dock wall. See, for example, U.S. Pat. Nos. 4,605,353, 4,208,161 and 4,605,353, each of which is incorporated herein by reference in its entirety. In this type of system, the distance from the dock wall to the hook varies as the hook moves through its arc of travel to engage the RIG bar, and as the vehicle moves up and down during the loading/unloading process. If the final distance between the hook and the dock face after the loading/unloading process is less than the distance when the process started, the RIG bar may impart such a high load on the hook that the hook may not release when desired.

All of the restraint systems described above operate by restricting horizontal movement of the transport vehicle away from the loading dock. This movement may be caused by a variety of factors, such as the driver inadvertently attempting to drive away from the loading dock while the restraint is engaged, the slope of the ground, and/or the kinetic energy imparted to the vehicle by the loading and unloading of goods and materials. Of these, the most common causes of vehicle horizontal movement are the accelerations/decelerations imparted to the vehicle by loading and unloading of goods and materials by hand, fork lift, etc.

Regardless of the cause of the movement, if the vehicle has moved away from the loading dock at the conclusion of the loading/unloading process, it can put a load on the restraining member of the restraint system, whether the restraining member is a blocking member, a rotating hook, etc. Although this situation is not unsafe, it can lead to an operational issue referred to as "hook pinch." Hook pinch occurs with vehicle restraint systems when the restraining member is loaded by the transport vehicle to the extent that, when the dock operator attempts to disengage the restraining member from the RIG bar and return the restraint system to the stored position, the operator is unable to do so because of binding between the restraining member and the RIG bar caused by the vehicle load. More specifically, in such situations the restraint system is not powerful enough to overcome the binding force and disengage the restraining member from the RIG bar. Typically, the only way to relieve this force so that the restraining member can be disengaged is to have the vehicle driver move the transport vehicle a slight distance back against the dock bumpers and away from the restraining member. This operation is called "bump-back," and can be a time-consuming effort in that it requires coordination between the dock operator and the transport vehicle driver. Accordingly, it would be advantageous to provide an improved vehicle restraint system that addresses the problem of hook pinch.

BRIEF DESCRIPTION OF THE DRAWINGS

FIGS. 3A-3F are a series of side views illustrating the vehicle restraint of FIG. 1 in various stages of operation, in accordance with an embodiment of the present technology.

DETAILED DESCRIPTION

Figure 1:
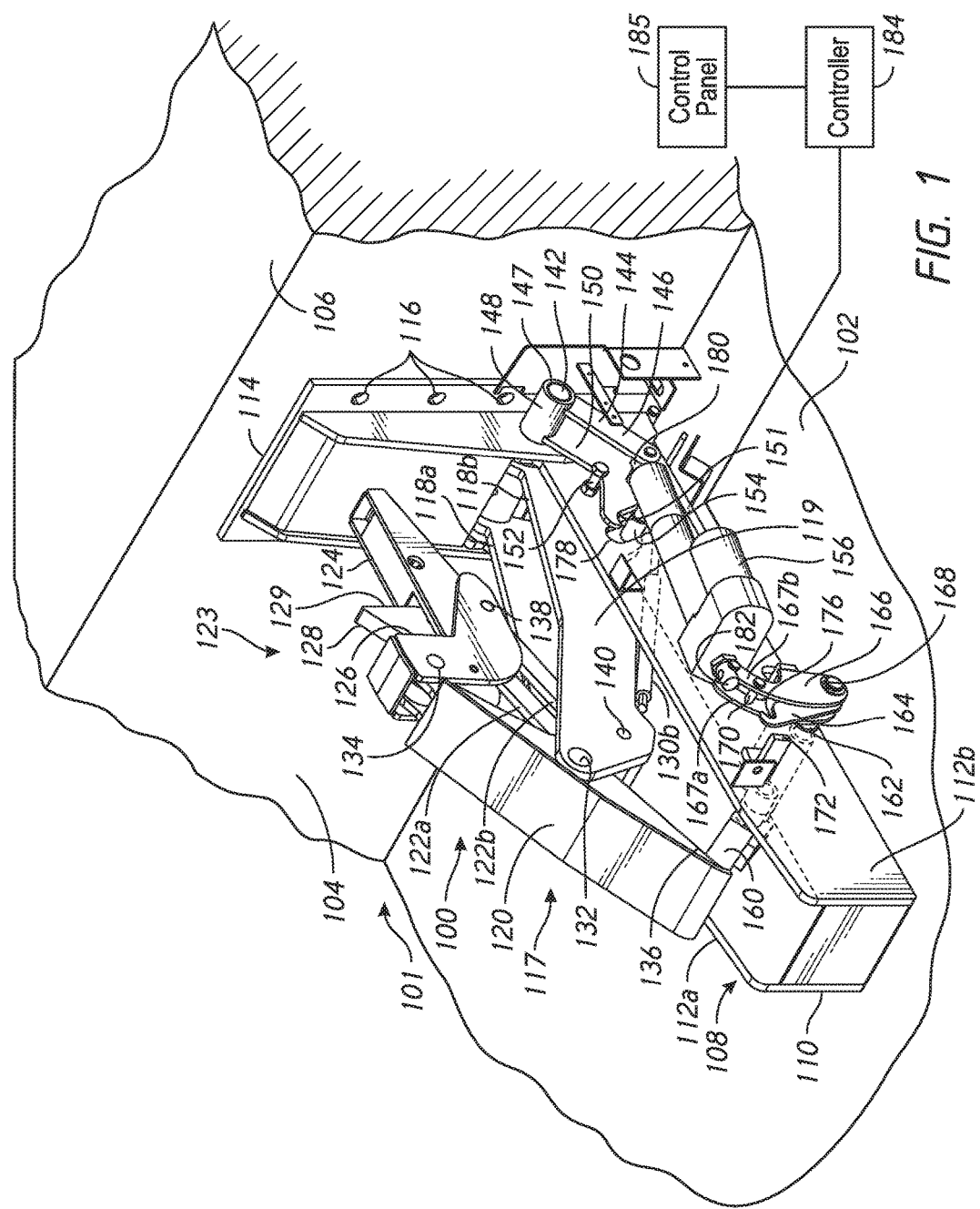
FIG. 1 is an isometric view of a vehicle restraint system configured in accordance with an embodiment of the present technology.

The following disclosure describes various embodiments of vehicle restraints that can be used to prevent trucks, trailers and other transport vehicles from moving away from a loading dock during a loading and/or unloading process. As discussed above, one operational issue that can affect the performance of vehicle restraints is known as "hook pinch." Hook pinch occurs when vehicle movement away from the loading dock causes the restraining member to bind to such an extent that the restraint system cannot be disengaged until the vehicle is moved back toward the loading dock face to relieve the binding load in an operation referred to as "bump-back." As described in greater detail below, vehicle restraints configured in accordance with some embodiments of the present technology can eliminate or at least greatly reduce the need for bump-back by use of a linkage that includes a collapsible member (e.g., a "break-away strut"). The collapsible member remains rigid (or at least substantially rigid) during RIG bar engagement, but collapses or otherwise retracts in response to a release command, thereby causing the restraining member to move both forward and downward to disengage the RIG bar. By moving slightly forward relative to the RIG bar, the restraining member avoids hook pinch and, as a result, the need for vehicle bump-back is eliminated.

Certain details are set forth in the following description and in FIGS. 1-9G to provide a thorough understanding of various embodiments of the present technology. In other instances, well-known structures, materials, operations and/or systems often associated with vehicle restraint systems, loading docks, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below. In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is an isometric view of a vehicle restraint 100 configured in accordance with an embodiment of the present technology. In the illustrated embodiment, the vehicle restraint 100 is installed at a loading dock 101 at a warehouse or other building. As is well known, the loading dock 101 can include an opening 106 in the building positioned directly above a dock wall 104 that extends vertically upward from a driveway 102. In most applications, the vehicle restraint 100 would be positioned generally in the center, or at least approximately in the center, of the building opening 106. Although not shown in FIG. 1, the loading dock can also include dock bumpers mounted to the dock wall 104 beneath the opening 106, and a dock leveler adjacent to the building floor to provide a ramp for moving materials into and/or out of a shipping trailer backed up to the loading dock 101 and engaged with the vehicle restraint 100.

In the illustrated embodiment, the vehicle restraint 100 includes a restraining structure 123 operably coupled to a frame 108 by a linkage 117. The frame 108 includes a housing 110 that extends outwardly from a base 114. The base 114 can be fixedly attached to the dock wall 104 by a plurality of suitable fasteners 116 (e.g., anchor bolts, screws, etc.) that extend through corresponding holes in the base 114 and engage the material in the dock wall 104. In other embodiments, however, the frame 108 can be mounted directly to the driveway 102 in front of the dock wall 104. The housing 110 includes opposing side plates 112 (identified individually as a first side plate 112a and a second side plate 112b). The linkage 117 includes a main arm 119 and an upper arm 120. The main arm 119 is operably disposed between the side plates 112 and pivotally coupled to the base 114 by a cylindrical pivot pin 142. In the illustrated embodiment, the main arm 119 is composed of a two generally-matching and spaced-apart arm members 118 (identified individually as a first arm member 118a and a second arm member 118b). In other embodiments, it is contemplated that the main arm 119 can be constructed from a single member, such as a single member having opposing side flanges. Distal end portions of the arm members 118 are pivotally coupled to an upper arm 120 by a pivot pin 132. In the illustrated embodiment, the upper arm 120 can have a generally inverted U-shaped cross section with opposing side flanges with corresponding bores that receive the pivot pin 132 and enable the upper arm 120 to rotate back and forth about the pivot pin 132.

In one aspect of the illustrated embodiment, the restraining structure 123 includes a hook assembly 124. The hook assembly 124 can include a first vertical surface 126 that serves as a primary vehicle restraint for engaging a RIG bar of a vehicle, and a spring-loaded secondary hook 128 that includes a second vertical surface 129 which can serve as a secondary restraint for vehicles having the RIG bar positioned further aft toward the dock wall 104. The hook assembly 124 is pivotally coupled to an upper end portion of the upper arm 120 by a pivot pin 134. Additionally, two hook struts 122 (identified individually as a first hook strut 122a and a second hook strut 122b) are operably coupled between the main arm 119 and the hook assembly 124 by a pivot pin 138 that pivotally couples one end of each hook strut 122 to the hook assembly 124, and a pivot pin 140 that pivotally couples the opposite end of each hook strut 122 the main arm 119.

In another aspect of the illustrated embodiment, biasing members 130 (identified individually as a first biasing member 130a and a second biasing member 130b) are operably coupled between the frame 108 and the main arm 119. More specifically, in the illustrated embodiment the first biasing member 130a is operably coupled between the first arm member 118a and the first side plate 112a, and the second biasing member 130b is similarly coupled between the second arm member 118b and the second side plate 112b. By way of example, the biasing members 130 can be telescoping gas springs that are configured to exert a force against the main arm 119 when compressed, thereby biasing the main arm 119 (and hence the linkage 117) toward an upper position in which the hook assembly 124 can engage a RIG bar (not shown) on a transport vehicle. In other embodiments, other types of biasing members can be used to bias the linkage 117 toward the upper position. Such biasing members can include, for example, suitably positioned compression springs, torsion springs, mechanical actuators, electrical, hydraulic, and/or pneumatic actuators, etc. Manual systems could also be employed to raise or at least partially raise the linkage 117 for RIG bar engagement.

In a further aspect of the illustrated embodiment, the vehicle restraint 110 includes a collapsible strut 160 which has a proximal end portion pivotally coupled to the side plates 112 of the housing 110 via a pivot shaft 162, and a distal end portion pivotally coupled to a lower end portion of the upper arm 120 by a corresponding pivot pin 136. As described in greater detail below, the collapsible strut 160 is a collapsible structure that maintains a generally straight and rigid configuration during engagement of the hook assembly 124 with a RIG bar, but is configured to collapse or "break-away" and reduce its overall length in response to a release command from, for example, the dock operator. This causes the hook assembly 124 to move downwardly and away from the dock face 140, thereby disengaging the hook assembly 124 from the RIG bar without binding or "hook pinch."

In another aspect of the illustrated embodiment, the vehicle restraint 100 includes an actuator 156 operably coupled between the main arm 119 and the collapsible strut 160. More specifically, the actuator 156 includes a first end portion 180 pivotally coupled to a first pivot arm 144, and a second end portion 182 pivotally coupled to a second pivot arm 166. The first pivot arm 144 includes a link 146 and a lever 150 which extend outwardly from a sleeve 148. The link 146 includes a proximal end portion fixedly attached to the sleeve 148, and a distal end portion pivotally coupled to the first end portion 180 of the actuator 156. The lever 150 includes a proximal end portion fixedly attached to the sleeve 148, and a distal end portion that includes a hook feature 151 (e.g., a notch or recess). Upward movement of the lever 150 is limited by a stop 152. The sleeve 148 includes a cylindrical bore 147 that slidably receives the pivot pin 142 and enables the first pivot arm 144 to rotate freely about the pivot pin 142. As described in greater detail below, in operation, initial extension of the actuator 156 rotates the first pivot arm 144 downwardly about the pivot pin 142 until the hook feature 151 on the lever 150 engages a main arm pin 154. The main arm pin 154 extends outwardly from the second arm member 118b through an arcuate slot 178 in the side plate 112b. Further downward rotation of the first pivot arm 144 drives the main arm pin 154 (and hence the main arm 119) downwardly to retract the linkage 117 into the housing 110.

At the opposite end of the actuator 156, the second pivot arm 166 includes first and second side plates 167a and 167b, respectively, that form a clevis-type connection to the second end portion 182 of the actuator 156. An engagement pin 170 extends horizontally between the two side plates 167, and a proximal end portion of each of the side plates 167 includes a cylindrical bore 168 that slidably receives the pivot shaft 162, enabling the second pivot arm 166 to rotate back and forth freely on the pivot shaft 162. In the illustrated embodiment, the vehicle restraint 110 further includes a break-away lever 164 disposed between the side plates 167 of the second pivot arm 166. The break-away lever 164 has a proximal end portion fixedly attached to the pivot shaft 162, and a distal end portion having a hook feature 176 (e.g., a notch or recess). As described in greater detail below, the hook feature 176 is configured to receive the engagement pin 170 as extension of the actuator 156 rotates the second pivot arm 166 outwardly about the pivot shaft 162. Once the engagement pin 170 contacts the hook feature 176, continued outward rotation of the second pivot arm 166 also rotates the break-away lever 164 outwardly. Because both the break-away lever 164 and the proximal end portion of the collapsible strut 160 are fixedly attached to the pivot shaft 162, outward rotation of the break-away lever 164 causes the proximal end portion of the collapsible strut 160 to rotate downwardly. Outward rotation of the second pivot arm 166 is limited by an actuator stop 172 that is fixedly attached to the second side plate 112b of the housing 110.

In the illustrated embodiment, the actuator 156 is a linear actuator that can include a telescoping pushrod that can be driven outwardly and inwardly by, for example, a bidirectional electric motor (e.g., a stepper motor) operably coupled to a suitable lead screw and drive nut arrangement. The actuator 156 can receive operational power and/or signals from a controller 184 via one or more electrical links (e.g., wires). The controller 184 can include one or more processing devices (e.g., a programmable logic controller (PLC)) configured to operate in accordance with instructions stored on computer-readable media in response to, for example, dock operator inputs via a control panel 185 or other suitable user interface operably connected to the controller 184. The controller 184 can receive power from a suitable power source (not shown) such as facility power, a battery, etc. In other embodiments, the actuator 156 can be a hydraulic actuator, a pneumatic actuator, as well as other types of mechanically and electrically operated linear actuators. In yet other embodiments, it is contemplated that the actuator 156 can be replaced by a suitable arrangement of a rotational actuator, and/or a manually operable system for controlling movement of the first pivot arm 144, the second pivot arm 166, and/or the associated components as described herein.

As those of ordinary skill in the art will appreciate, most of the components of the vehicle restraint 100 described above can be made from suitable types of known materials that are welded or otherwise joined together (e.g., bolted together) using suitable techniques well established in the art for cost-effectively manufacturing vehicle restraint systems and similar structures. For example, in various embodiments portions of the frame 108, the main arm 118, the upper arm 120, the hook assembly 124, the collapsible strut 160, etc. can be made from mild or carbon steel (e.g., ASTM A36, A36M, A53, etc.) plates, bars, tubes, angles, beams, etc. of appropriate gauge which are cut or otherwise formed to shape and welded, riveted or bolted together using conventional methods well known in the art. The various pivot pins, fasteners, etc. used herein can also be made from suitable steels, such as carbon steels, alloy steels, stainless steels, etc. In other embodiments, other materials (e.g., aluminum) and/or methods can be used to manufacture and/or assemble various embodiments of the vehicle restraints described herein without departing from the spirit or scope of the present disclosure.

Figure 2:
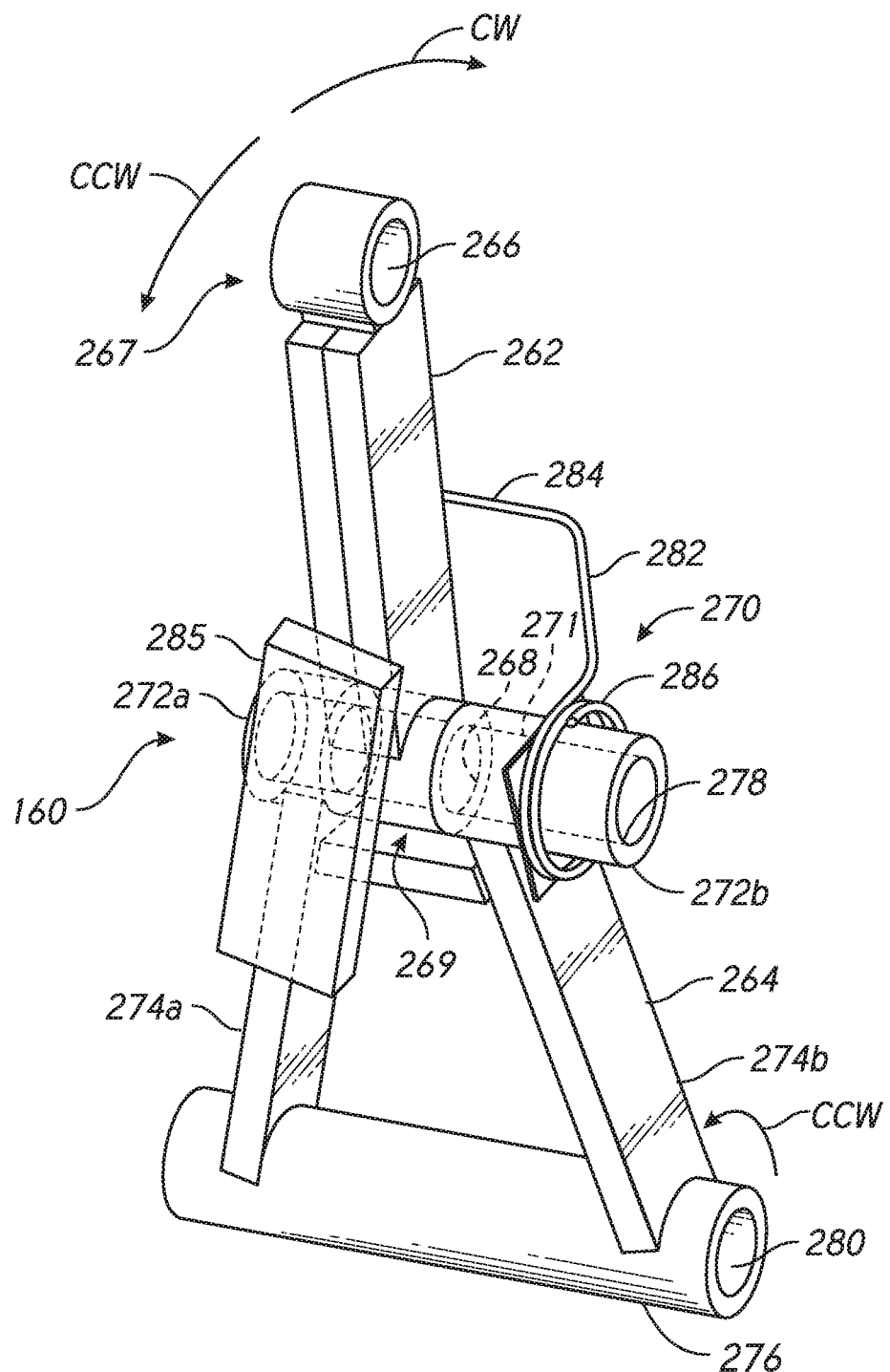
FIG. 2 is an enlarged isometric view of a collapsible strut for use with the vehicle restraint of FIG. 1, configured in accordance with an embodiment of the present technology.

FIG. 2 is an enlarged front isometric view of the collapsible strut 160 configured in accordance with an embodiment of the present technology. (Although referred to herein as a collapsible strut for ease of reference, the collapsible strut 160 can also be referred to as, for example, a "collapsible member," "break-away member," "break-away arm," etc.) In the illustrated embodiment, the collapsible strut 160 includes a first link (identified as an upper link 262) and a second link (identified as a lower link 264) pivotally coupled together by a joint 270 therebetween. The lower link 264 includes a pair of legs 274 (identified individually as a first leg 274a and a second leg 274b) fixedly attached (e.g., welded) to a tube 276. The tube 276 includes a central bore 280 configured to receive the pivot shaft 162 (FIG. 1). The pivot shaft 162 extends outwardly from both sides of the tube 276 to pivotally couple the collapsible strut 160 to the side plates 112 of the housing 110 (FIG. 1). In one aspect of this embodiment, the tube 276 is fixedly attached (e.g., welded, bolted, or otherwise fastened) to the pivot shaft 162 so that rotation of the pivot shaft 162 about its central axis also rotates the lower link 264. The joint 270 includes a first link tube portion 272a and a second link tube portion 272b spaced apart from each other to define a gap therebetween that receives a first end portion 269 of the upper link 262. The link tube portions 272 are fixedly attached (e.g., welded) to upper portions of the legs 274, and have bores 278 which are coaxially aligned with a bore 268 extending through the first end portion 269. A pivot pin 271 extends through the link tube bores 278 and the bore 268 in the first end portion 269 to pivotally join the upper link 262 to the lower link 264. The upper link 262 includes a second end portion 267 having a bore 266 that receives the pivot pin 136 for pivotally coupling the upper link 262 to the upper arm 120 (FIG. 1).

In one aspect of the illustrated embodiment, the collapsible strut 160 further includes a link stop 285 fixedly attached (e.g., welded) to at least the first leg 274a of the lower link 264. In the illustrated embodiment, the link stop 285 is a piece of material (e.g., steel) that extends upwardly from the lower leg 264 and adjacent to the upper link 262. As described in greater detail below, in operation the link stop 285 prevents the upper link 262 from rotating in a counterclockwise (CCW) direction relative to the lower link 264 about the joint 270 beyond a slightly "over-center" position. More specifically, when the upper link 262 is bearing against the link stop 285 as shown in FIG. 2, the upper link 262 is positioned in a stable, slightly over-center position relative to the lower link 264, such that the upper link 262 is generally in co-linear alignment with the lower link 264, but angled slightly toward and against the link stop 285 in the CCW direction. In such a position (which can, for example, be referred to as a "locked" position), the collapsible strut 160 can sustain compression loads as a generally rigid member.

In another aspect of this embodiment, the collapsible strut 160 further includes a biasing member 282 configured to bias the upper link 262 against the link stop 285. More specifically, in the illustrated embodiment the biasing member 282 is a torsion spring having a series of coils 286 that wrap around the second link tube portion 272b, and an arm 284 that bears against the upper link 262. An end portion of the spring coils 286 is engaged or otherwise fixed to the second link tube portion 272b, and the coils 286 are pre-loaded in torsion before the arm 284 is positioned behind the upper link 262. As a result, the arm 284 biases the upper link 262 against the link stop 285. As described in greater detail below, the biasing member 282 can act as a "reset member" that tends to drive the upper link 262 into alignment with the lower link 264 and maintain the collapsible strut 160 as a rigid member, but will also permit the upper link 262 to rotate away from the link stop 285 in a clockwise (CW) direction to thereby "collapse" or retract the collapsible strut 160 when a sufficient torque is applied to the lower link 264 in the CCW direction relative to the pivot shaft 162 (FIG. 1). By way of example, in some embodiments the biasing member 282 can be made out of a suitable gauge spring steel. In other embodiments, however, the collapsible strut 160 can include other spring configurations and/or other biasing members for biasing the upper link 262 as described herein.

Figure 3A:
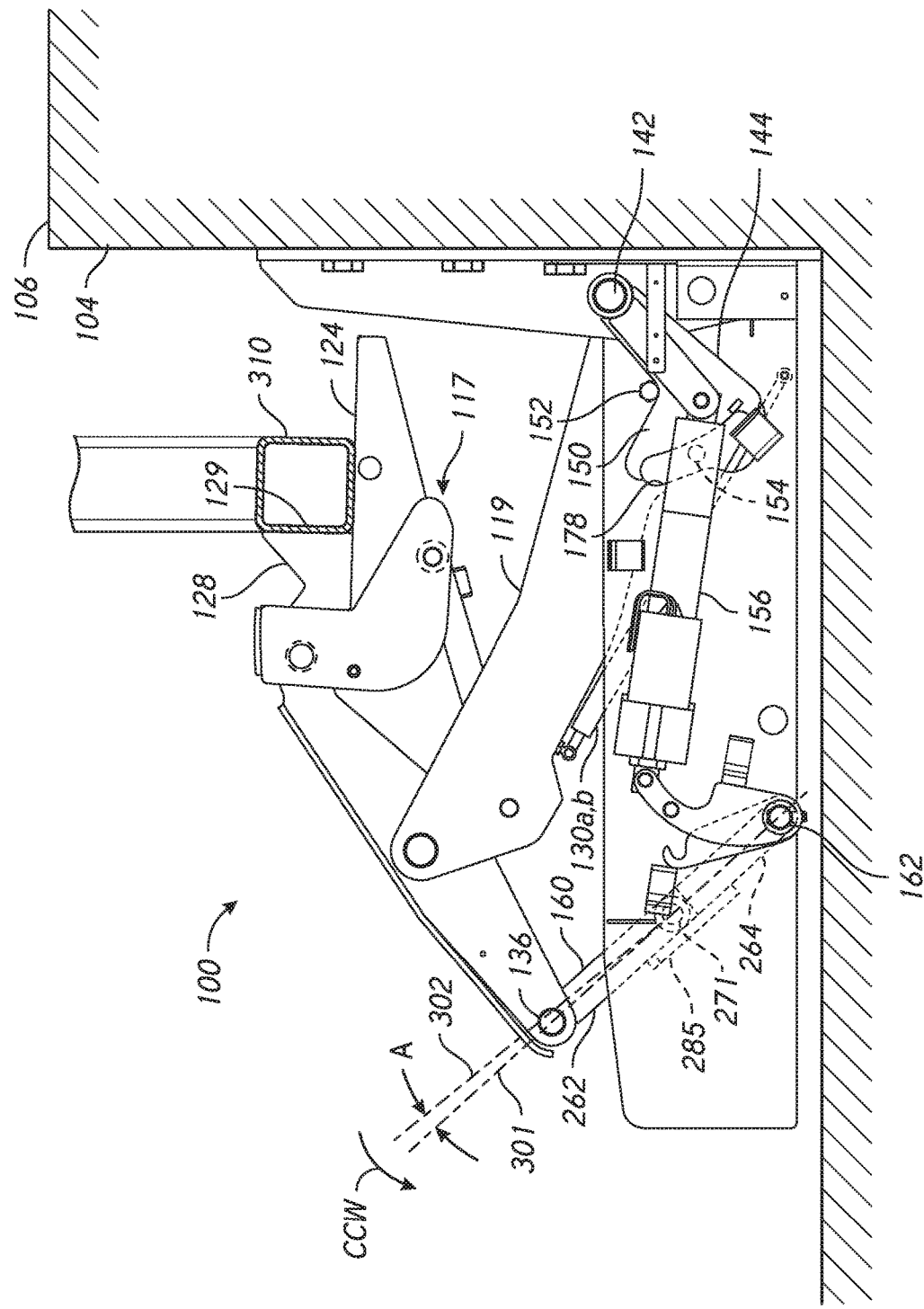

FIGS. 3A-3F are a series of side views illustrating the vehicle restraint 100 in various stages of operation in accordance with an embodiment of the present technology. Referring first to FIG. 3A, the hook assembly 124 has engaged an RIG 310 (shown in cross-section) of a vehicle (e.g., a shipping trailer; not shown) which has backed up to the dock wall 104 for the loading and/or unloading of goods, materials, etc. through the opening 106 in a warehouse or other building. More specifically, in this view the actuator 156 is fully retracted so that the lever 150 contacts the upper stop 152. This permits the main arm pin 154 to move upwardly in the slot 178 as the biasing members 130 raise the main arm 119 to engage the hook assembly 124 with the RIG 310 and prevent the vehicle from moving away from the dock wall 104. Moreover, the compressibility of the biasing members 130 enable the hook assembly 124 to move upwardly and downwardly as necessary to maintain engagement with the RIG 310 as the vehicle is loaded and/or unloaded with goods or materials.

As also shown in FIG. 3A, the angular position of the upper link 262 of the collapsible strut 160 can be defined by a first centerline 301 that extends through the central axes of the pivot pin 136 and the pivot pin 271. Similarly, the angular position of the lower link 264 can be defined by a second centerline 302 that extends through the central axes of the pivot pin 271 and the pivot shaft 162. In some embodiments, during elevation of the hook assembly 124 and engagement with the RIG 310, the biasing member 282 (FIG. 2) biases the upper link 262 against the link stop 285 in a slight "over-center" position in the CCW direction so that the first centerline 301 is positioned at a slight angle A (e.g., an angle of from about 1 degree to about 5 degrees) relative to the second centerline 302. This creates a stable strut configuration that can sustain compression loads without buckling about the joint 170 during the hook elevation and engagement phases of restraint operation.

Figure 3B:
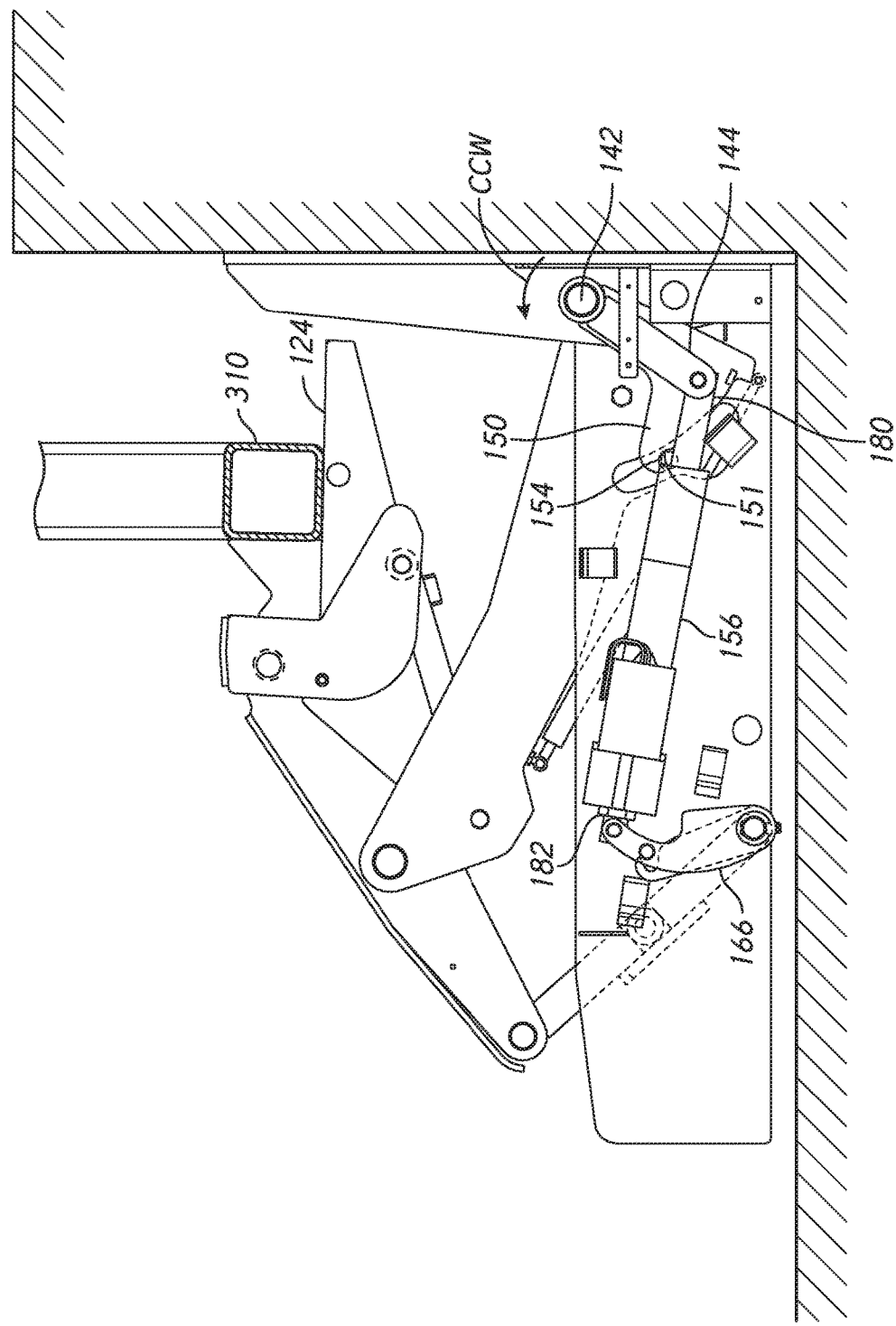
Figure 3D:
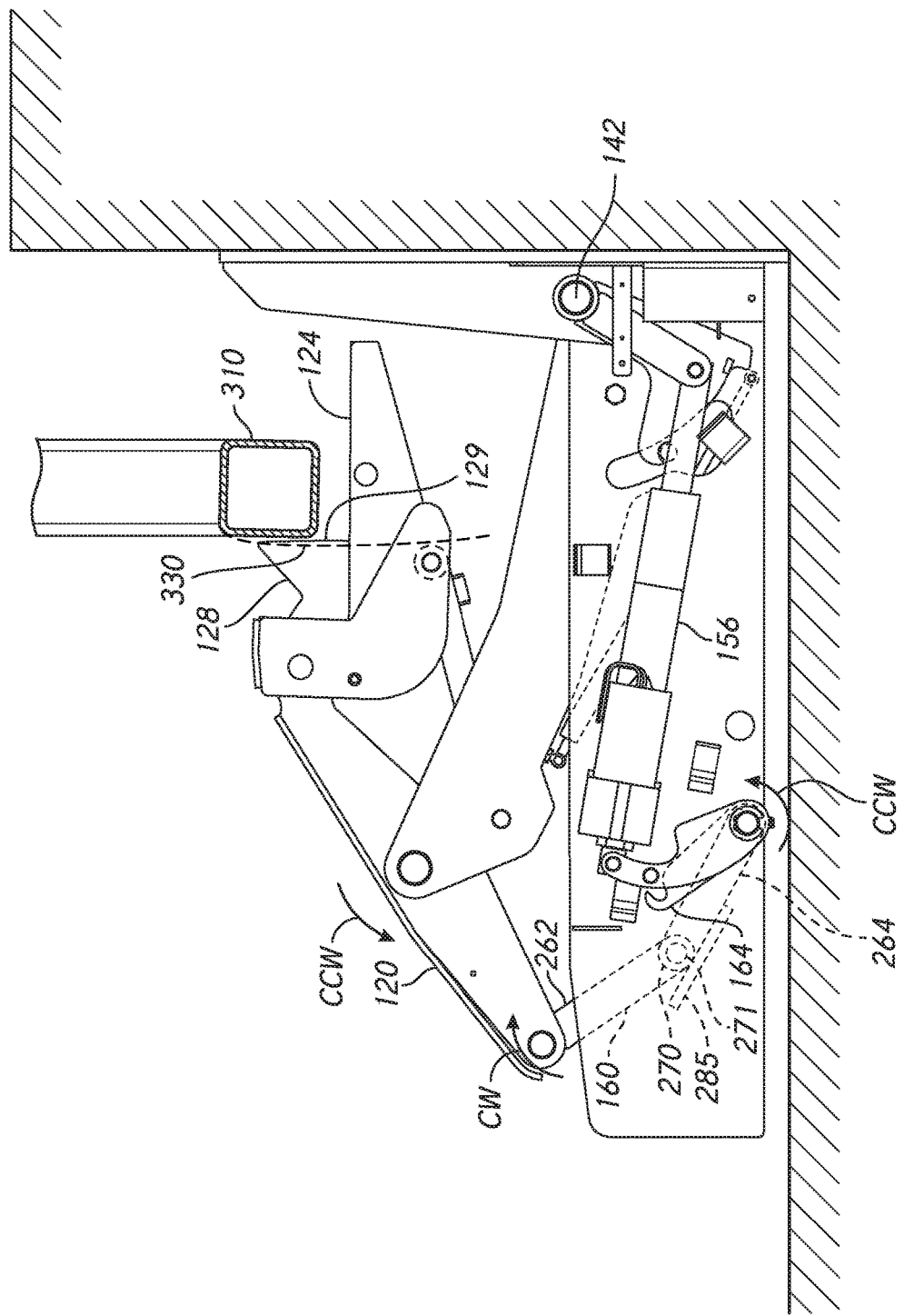

To disengage the vehicle restraint 110 from the RIG 310, the actuator 156 is extended. More specifically, an operator (e.g., a dock operator) can provide a release command to the controller 184 via the control panel 185 (FIG. 1) and/or other user interface. The controller 184 can in turn energize an electric motor on the actuator 156, driving the actuator 156 to extend outwardly in length. As shown in FIG. 3B, as the actuator 156 extends, the first end 180 moves to the right in FIG. 3B and rotates the first pivot arm 144 in the counter-clockwise (CCW) direction about the pivot pin 142 until the hook feature 151 on the lever 150 comes into contact with the main arm pin 154. Referring next to FIG. 3C, as the actuator 156 continues to extend, the second end 182 moves to the left in FIG. 3C and rotates the second pivot arm 166 in the CCW direction about the pivot shaft 162 and away from a forward stop 320 until the engagement pin 170 is received by the hook feature 176 in the break-away lever 164 (see also FIG. 1). As noted above, both the break-away lever 164 and the lower link 264 of the collapsible strut 160 are fixedly attached to the pivot shaft 162. As a result, when the engagement pin 170 contacts the break-away lever 164 and drives it outwardly in the CCW direction, the break-away lever 164 applies a torque to the pivot shaft 162 which in turn applies a torque to the lower link 264 of the collapsible strut 160, causing the lower link 264 to also rotate in the CCW direction. As shown in FIG. 3D, this rotation of the lower link 264 causes the upper link 262 to overcome the biasing force of the biasing member 284 (FIG. 2) and rotate away from the link stop 285 in the clockwise (CW) direction about the pivot pin 271. Once the upper link 262 rotates in the CW direction to an over-center position in the direction opposite the link stop 285, continued rotation of the lower link 164 in the CCW direction (and/or a compression force on the collapsible strut 160 from the upper arm 120) causes the upper link 262 and the lower link 264 to rotate inwardly toward each other as the collapsible strut 160 "collapses," thereby reducing the overall length of the collapsible strut 160. Collapsing the collapsible strut 160 in the foregoing manner causes the hook assembly 124 to move downwardly and forwardly to disengage from the RIG 310 without binding, even if the RIG 310 was bearing against the vertical surface 129 with a force sufficient to create "hook pinch" in conventional vehicle restraints.

Figure 3E:
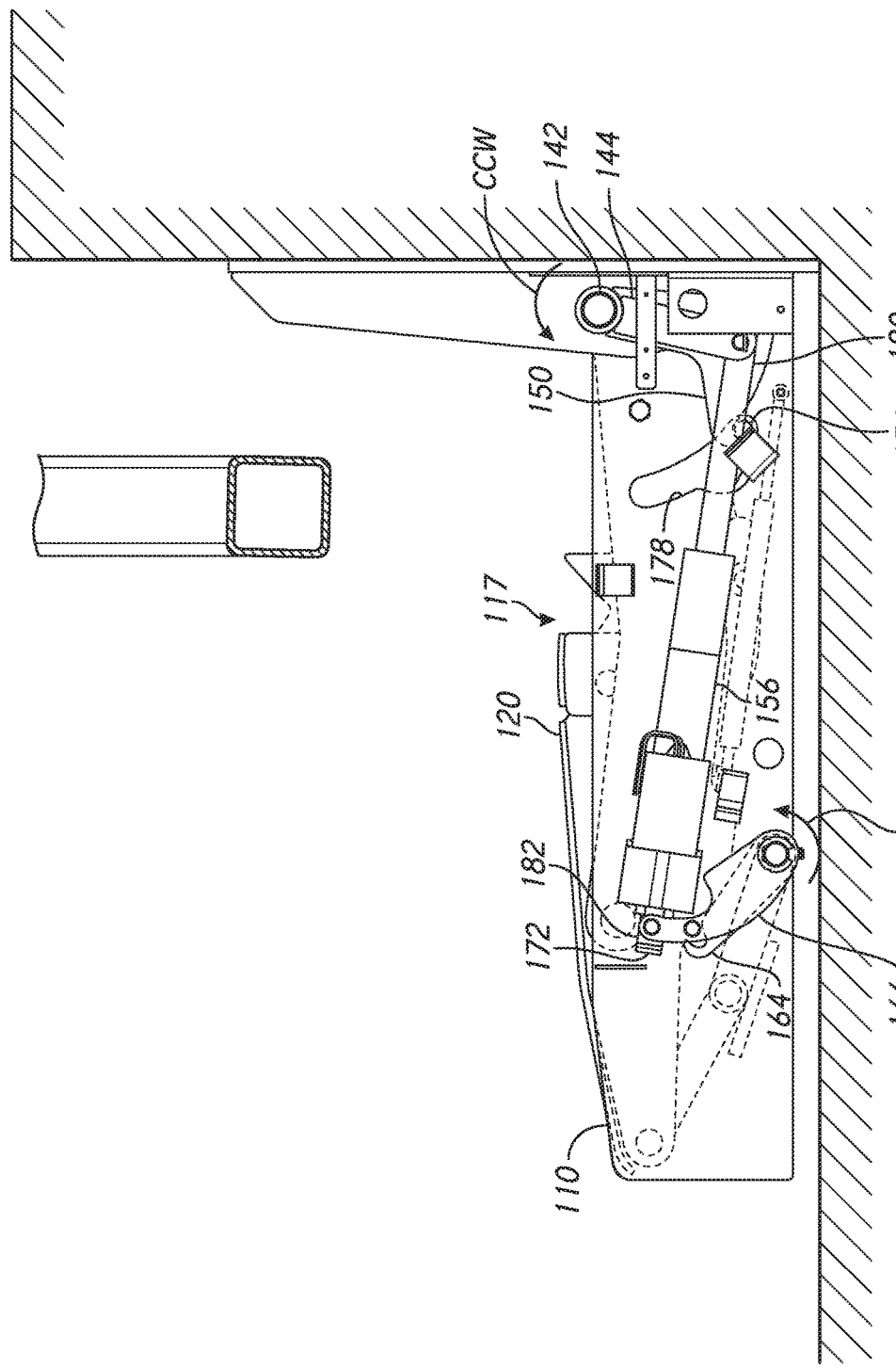

Referring next to FIG. 3E, continued extension of the actuator 156 causes the second pivot arm 166 to continue rotating outwardly in the CCW direction until the second end 182 of the actuator 156 contacts the actuator stop 172. Further extension of the actuator 156 causes the first end 180 to drive the first pivot arm 144 further in the CCW direction about the pivot pin 142, thereby driving the main arm pin 154 further downwardly in the slot 178 until the restraint linkage 117 is fully retracted into the housing 110 as shown in FIG. 3F. Once the linkage 117 is fully retracted into the housing 110, the torque exerted by the biasing member 282 against the upper link 262 of the collapsible strut 160 can drive the upper link 262 in the CCW direction about the pivot pin 271 until the upper link 262 contacts the link stop 285, thereby returning the collapsible strut 160 to its fully extended position. As described above in reference to FIGS. 2 and 3A, in this position the upper link 262 is aligned, or at least approximately in co-linear alignment with the lower link 264, and the collapsible strut 160 behaves as a "rigid" strut or member extending between the frame 108 and the upper arm 120. The collapsible strut 160 maintains this configuration during raising of the vehicle restraint 100 and engagement with a RIG.

To raise the linkage 117 from the position shown in FIG. 3F, the actuator 156 is retracted as shown in FIG. 3A so that the biasing members 130 can drive the main arm 119 upwardly. As described above with reference to FIG. 3A, this raises the linkage 117 and brings the hook assembly 124 into engagement with the RIG 310. In some embodiments of the vehicle restraint 100, it is possible for the collapsible strut 160 to remain in a slightly collapsed configuration while the linkage 117 is being raised by the biasing members 130 to bring the hook assembly 124 into engagement with the RIG 310. More specifically, with reference to FIG. 3F, as the actuator 156 retracts from this position, the first end 180 moves to the left, thereby causing the lever 150 to rotate in the clockwise direction about the pivot pin 142, which in turn releases the main arm pin 154 and allows the main arm 119 to begin rotating upwardly under the force of the biasing members 130. As this happens, the second end 182 of the actuator 156 stays in position against the actuator stop 172, which in turn holds the lower link 264 of the collapsible strut 160 down in the fully retracted position and prevents it from rotating clockwise about the pivot shaft 162. However, the upper link 262 of the collapsible strut 160 is able to rotate about the pivot pin 271 in the clockwise direction in response to the upward rotation of the main arm 119. As a result, the collapsible strut 160 can assume a partially collapsed configuration similar to that shown in, for example, FIG. 3E or 3D, as the linkage 117 starts to rise, and maintain such a configuration throughout the upward movement of the linkage 117 as it moves the hook assembly 124 into engagement with the RIG 310. One undesirable consequence of having the collapsible strut 160 be slightly collapsed during raising of the linkage 117, is that it causes the hook assembly 124 to move in a generally upward but slightly arcuate path as indicated by the dotted line 330 in FIG. 3D. As a result, the hook assembly 124 can become bound against the RIG 310 and/or prevent full engagement of the hook assembly 124 with the RIG 310 if the RIG 310 is in a forward-most position prior to engagement. Conversely, if the collapsible strut 160 maintains its "rigid" over-center configuration as shown in, for example, FIG. 3A throughout upward movement of the linkage 117, the hook assembly 124 moves only upwardly in a straight vertical path because of the configuration of the linkage 117. Straight vertical movement of the hook assembly 124 is desired to avoid binding of the hook assembly 124 during engagement with the RIG 310. Accordingly, in some embodiments it would be advantageous for the collapsible strut 160 to remain in the over-center configuration throughout upward movement of the linkage 117 and engagement of the hook assembly 124 with the RIG 310.

Figure 4:
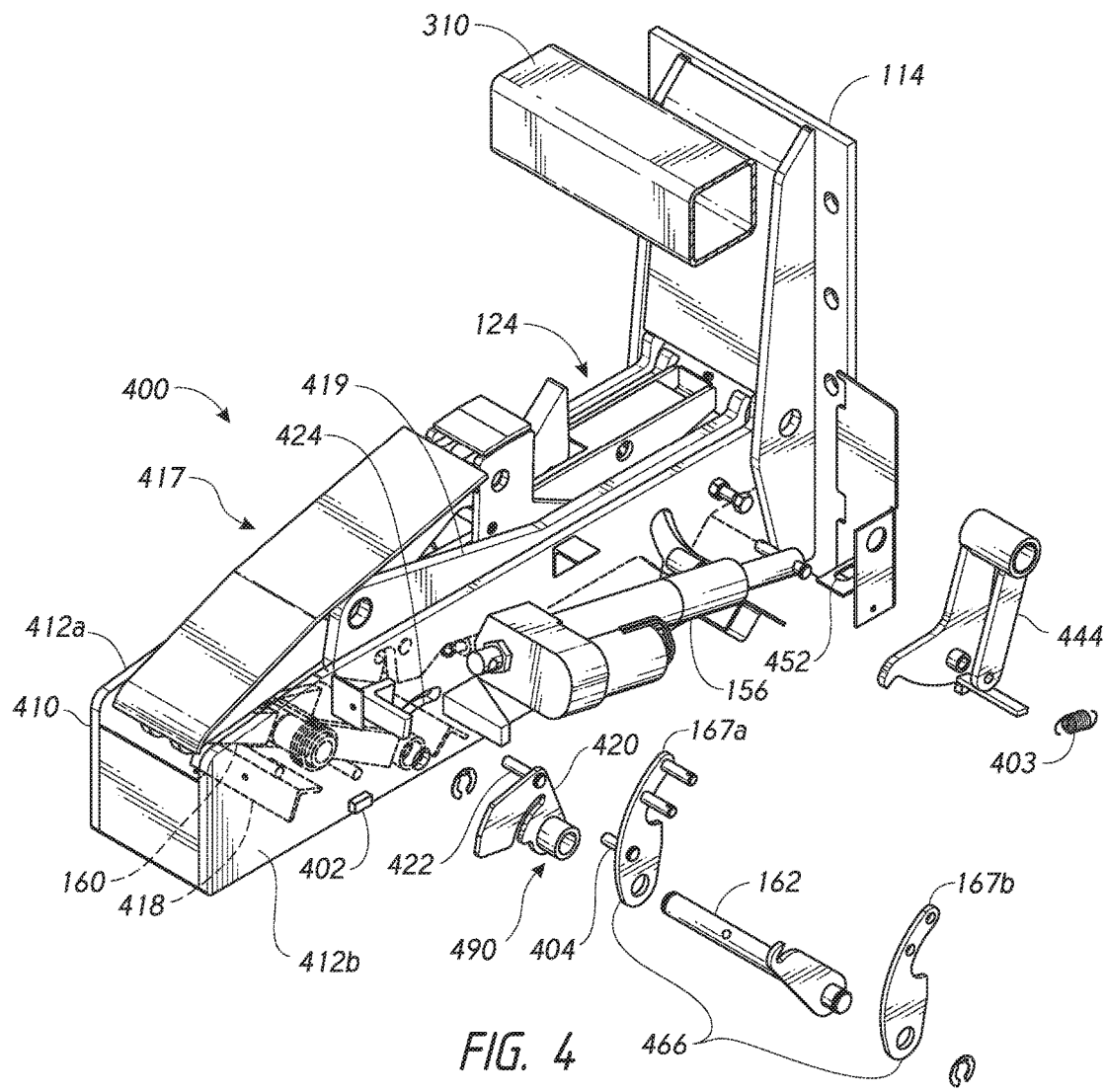
FIG. 4 is a partially exploded isometric view of a vehicle restraint configured in accordance with another embodiment of the present technology.

FIG. 4 is a partially exploded isometric view of a vehicle restraint 400 having a main arm hold down mechanism 490 configured in accordance with an embodiment of the present technology. As described in greater detail below, the hold down mechanism 490 can enable the collapsible strut 160 to maintain its rigid over-center configuration throughout elevation of the hook assembly 124. The vehicle restraint 400 is at least substantially similar in structure and function to the vehicle restraint 100 described in detail above, and indeed, many components of the vehicle restraint 400 can be identical to the corresponding components of the vehicle restraint 100 described above. For example, the vehicle restraint 400 includes a linkage 417 for raising and lowering the hook assembly 124. The linkage 417 includes a main arm 419 that is pivotally coupled to the base 114 and is operably disposed between a first side plate 412a and a second side plate 412b of a housing 410. In the illustrated embodiment, the housing 410, the main arm 419 and the other components of the linkage 417 are substantially the same as the corresponding components of the vehicle restraint 100 described above except for the modifications described below to accommodate the main arm hold down mechanism 490.

Figure 5:
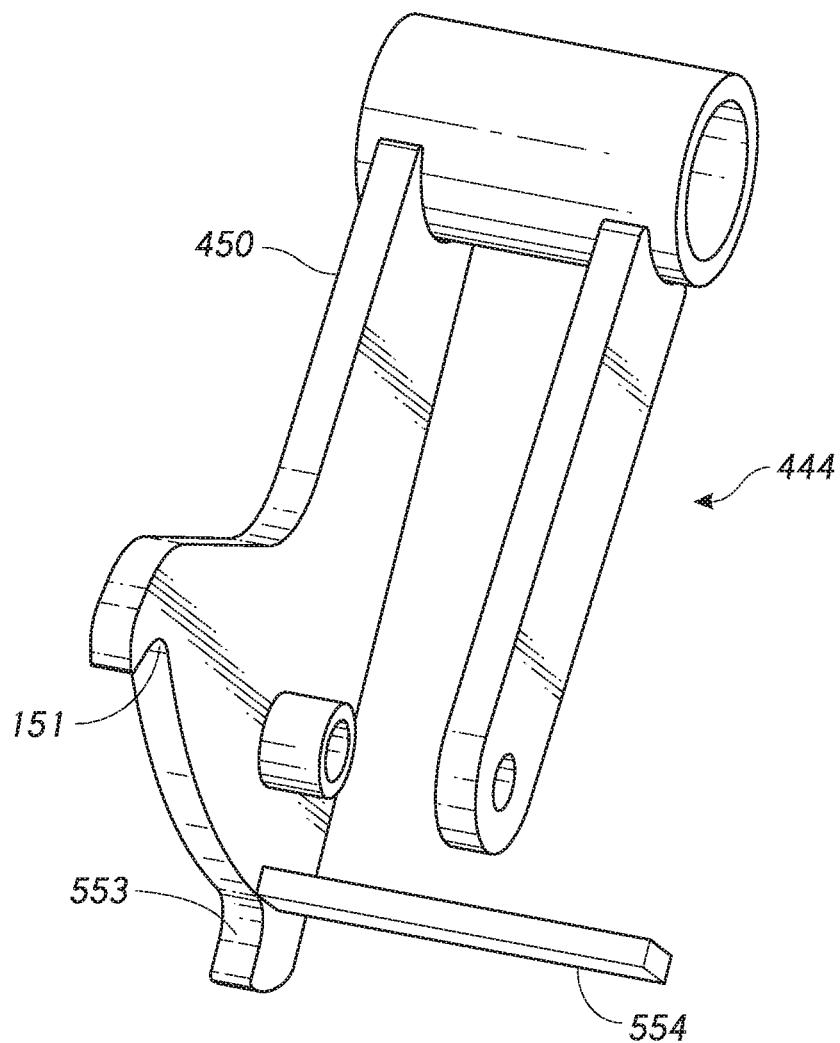
FIG. 5 is an enlarged isometric view of a pivot arm of the vehicle restraint of FIG. 4, configured in accordance with an embodiment of the present technology.

In the illustrated embodiment, the main arm hold down mechanism 490 includes a restraining member 420 that cooperates with a first pivot arm 444 and a second pivot arm 466. The second pivot arm 466 can be identical to the second pivot arm 166 described in detail above with reference to, e.g., FIG. 1 except that the second pivot arm 466 can include a cylindrical catch pin 404 that extends inwardly from the side plate 167a. FIG. 5 is an enlarged isometric view of the first pivot arm 444. Referring to FIGS. 4 and 5 together, the first pivot arm 444 is at least generally similar in structure and function to the first pivot arm 144 described in detail above with reference to FIG. 1. In this particular embodiment, however, the first pivot arm 444 includes a lever 450 having a second hook feature 553 in addition to the first hook feature 151 of the lever 150 described above. Additionally, the first pivot arm 444 also includes a post 554 extending outwardly from the lever 450. As shown in FIG. 4, a biasing member 403 (e.g., a tension spring) attaches between the post 554 and a bracket 452 on the housing 410 to bias the first pivot arm 444 downwardly in the counterclockwise (CCW) direction.

Figure 6:
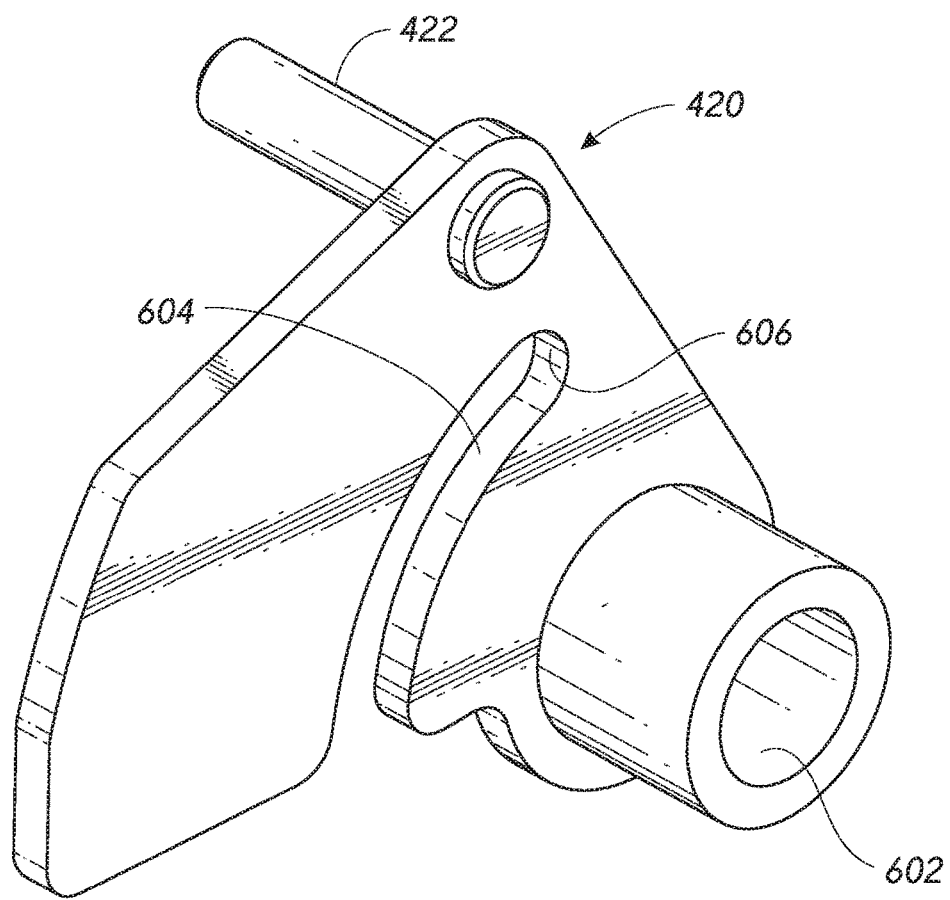
FIG. 6 is an enlarged isometric view of a restraining member of the vehicle restraint of FIG. 4, configured in accordance with an embodiment of the present technology.

FIG. 6 is an enlarged isometric view of the restraining member 420. Referring to FIGS. 4 and 6 together, in the illustrated embodiment the restraining member 420 includes a cylindrical bore 602 that rotatably receives the pivot shaft 162. Additionally, the restraining member 420 includes an arcuate slot 604 and a cylindrical engagement pin 422. The arcuate slot 424 includes an opening on one end and an end portion 606 on the other end, and is configured to receive the catch pin 404 of the second pivot arm 466 therein. The engagement pin 422 extends inwardly from the restraining member 420 and is configured to move back and forth in an arcuate slot 424 that is formed in the side plate 412b of the housing 410.

Figure 7:
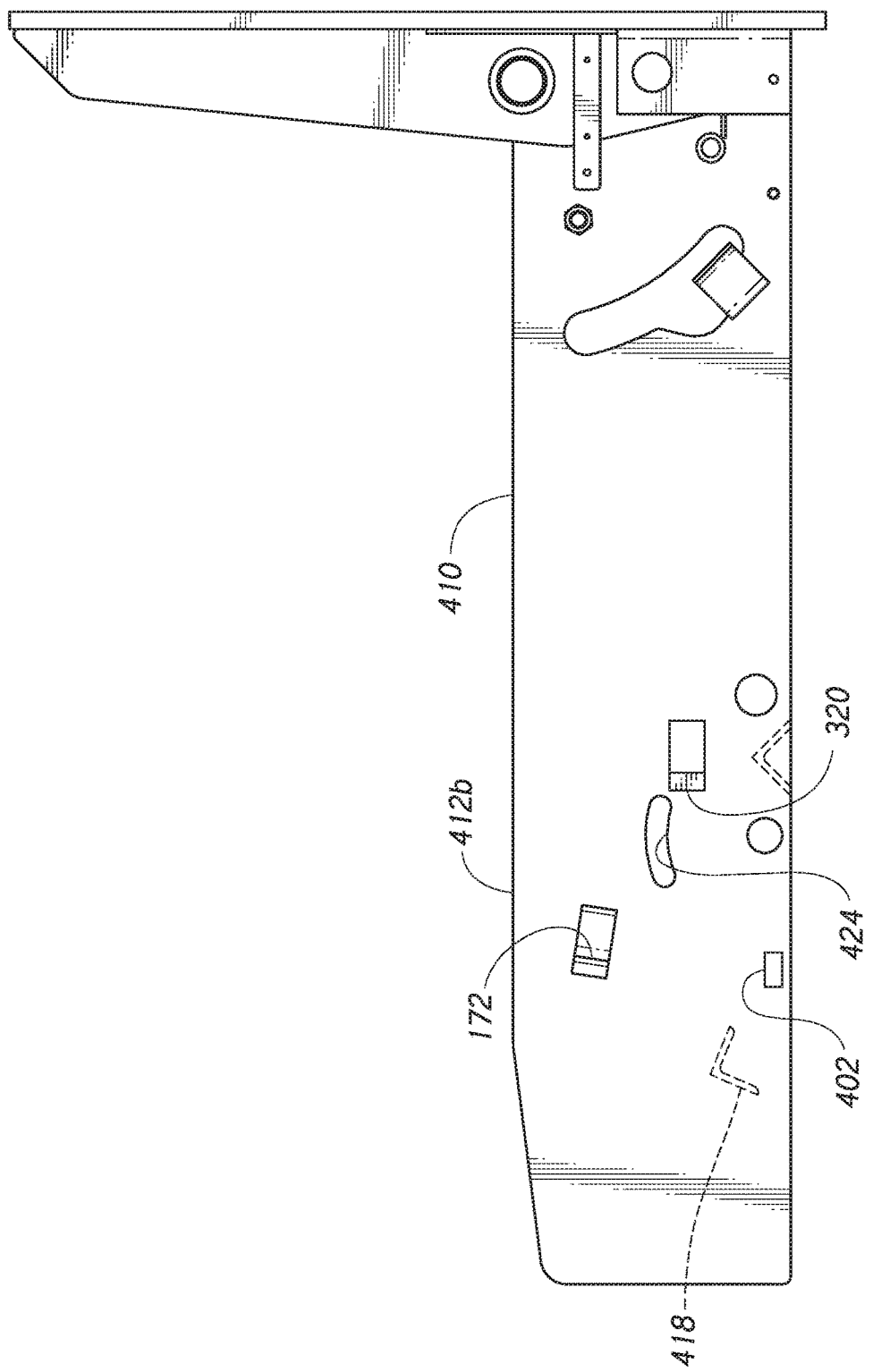
FIG. 7 is a side view of a housing of the vehicle restraint of FIG. 4, configured in accordance with an embodiment of the present technology.

FIG. 7 is an enlarged side view of the housing 410. Referring to FIGS. 4 and 7 together, in addition to the arcuate slot 424, the side plate 412b carries a stop block 402 that limits CCW rotation of the restraining member 424 about the pivot shaft 162. Additionally, in some embodiments a cross member 418 can be installed between the first side plate 412a and the second side plate 412b and positioned to contact the collapsible strut 160 when the restraint 400 is in the fully retracted position (as shown in, for example, FIG. 3F) to force the collapsible strut 160 into the over-center configuration.

Figure 8:
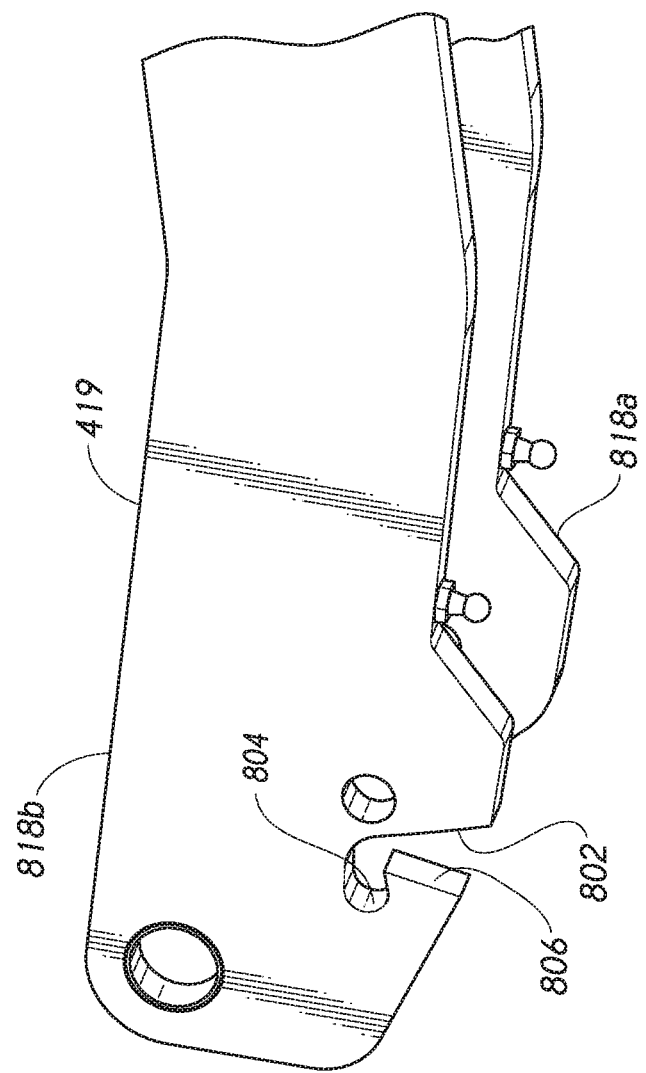
FIG. 8 is an enlarged isometric view of a distal end portion of a main arm of the vehicle restraint of FIG. 4, configured in accordance with an embodiment of the present technology.

FIG. 8 is an enlarged isometric view of the distal end portion of the main arm 419. As with the main arm 119 described in detail above, the main arm 419 includes two spaced-apart arm members 418 (identified individually as a first arm member 418a and a second arm member 418b). In the illustrated embodiment, however, the second arm member 818b includes an engagement slot 802 in a lower edge portion thereof that is configured to receive the engagement pin 422 of the restraining member 420. In this regard, the engagement slot 802 includes a contact surface 806 leading from an opening of the engagement slot 802 to a notch 804.

Figure 9A:
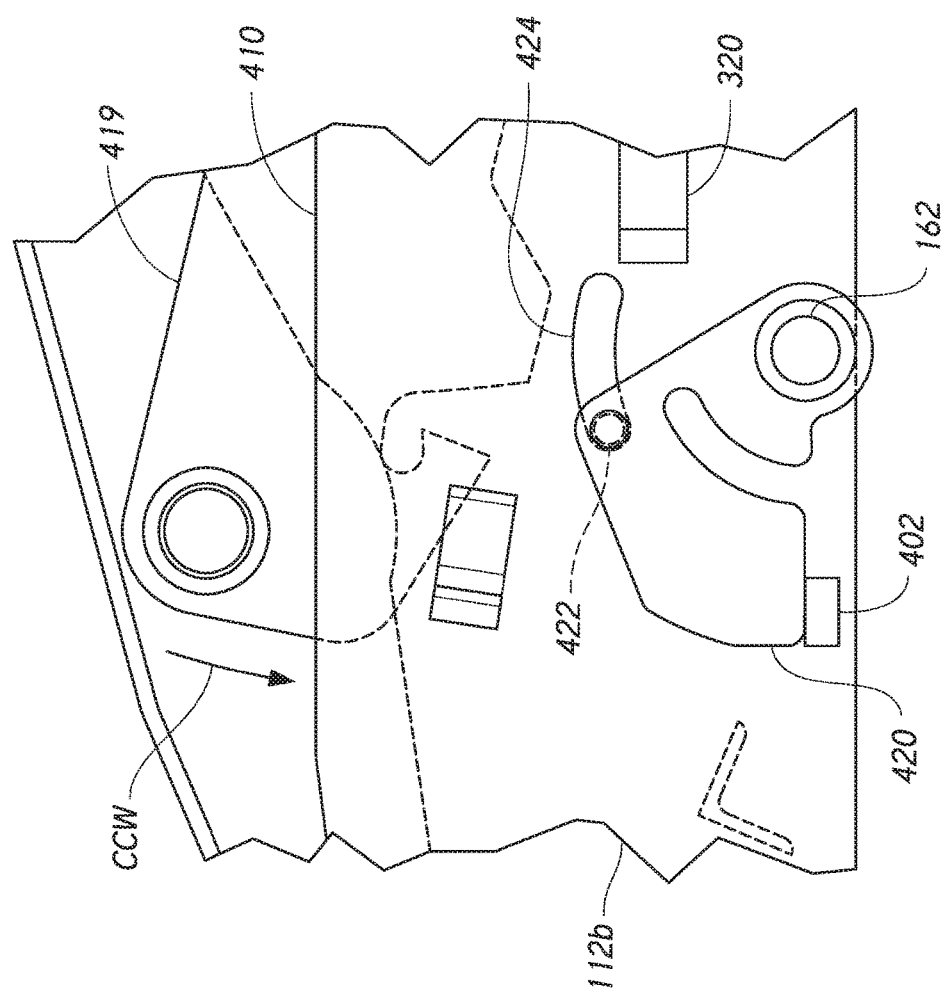
FIGS. 9A-9G are a series of side views illustrating a portion of the vehicle restraint of FIG. 4 in various stages of operation, in accordance with an embodiment of the present technology.
Figure 9B:
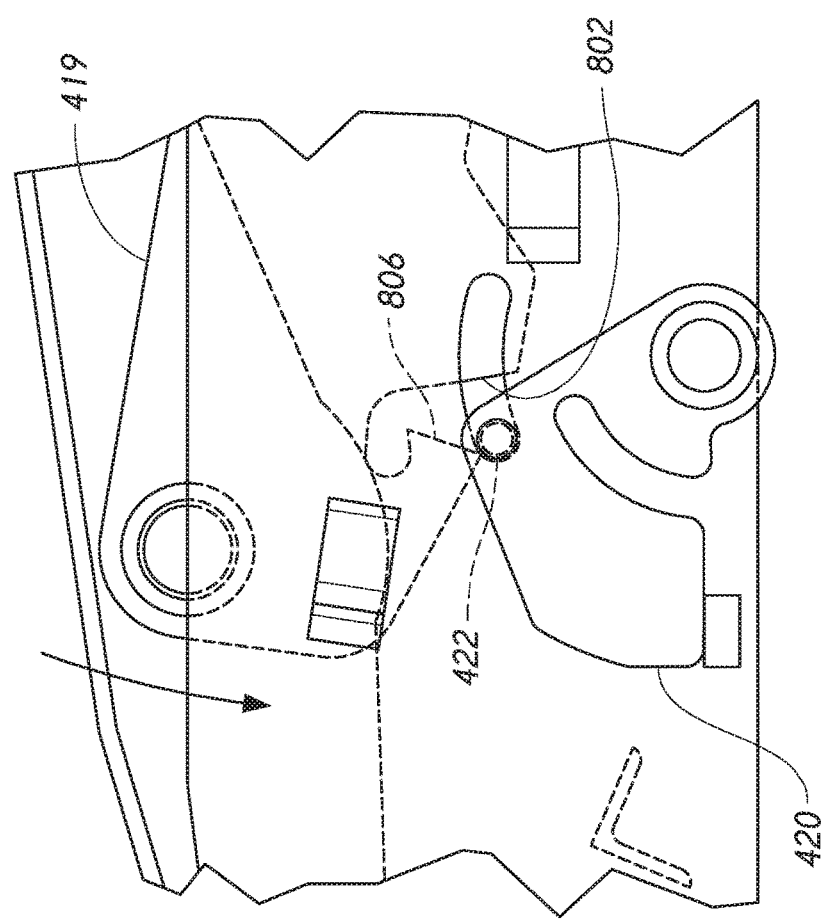
Figure 9C:
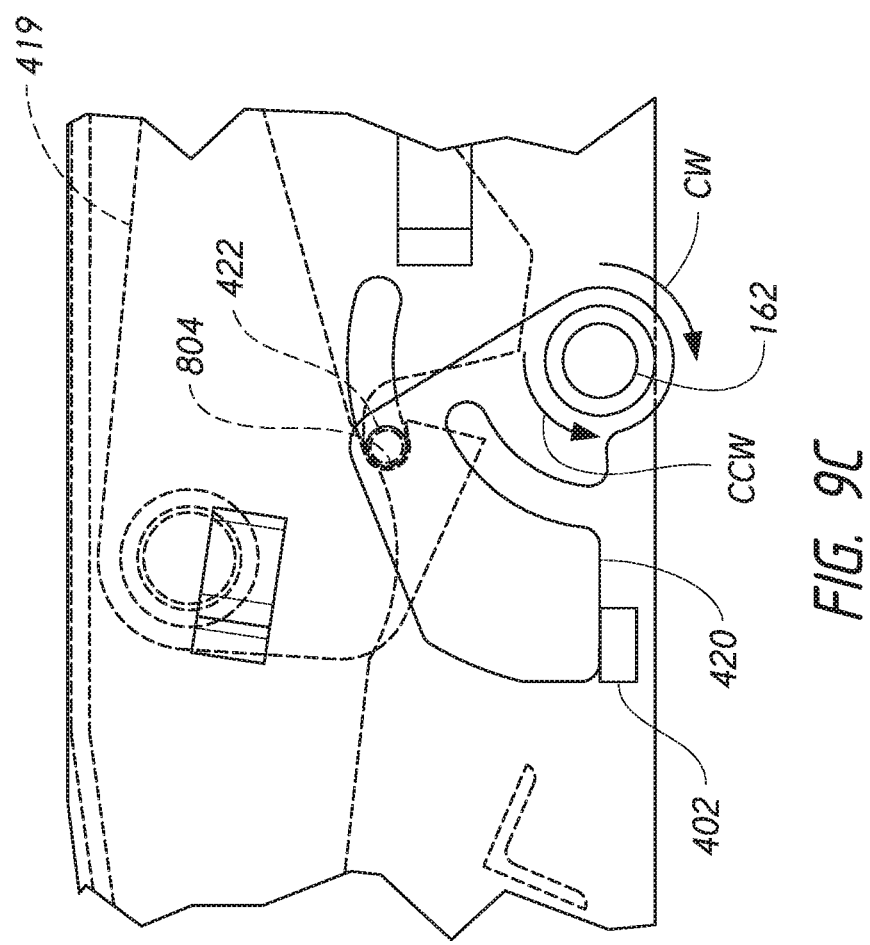
Figure 9D:
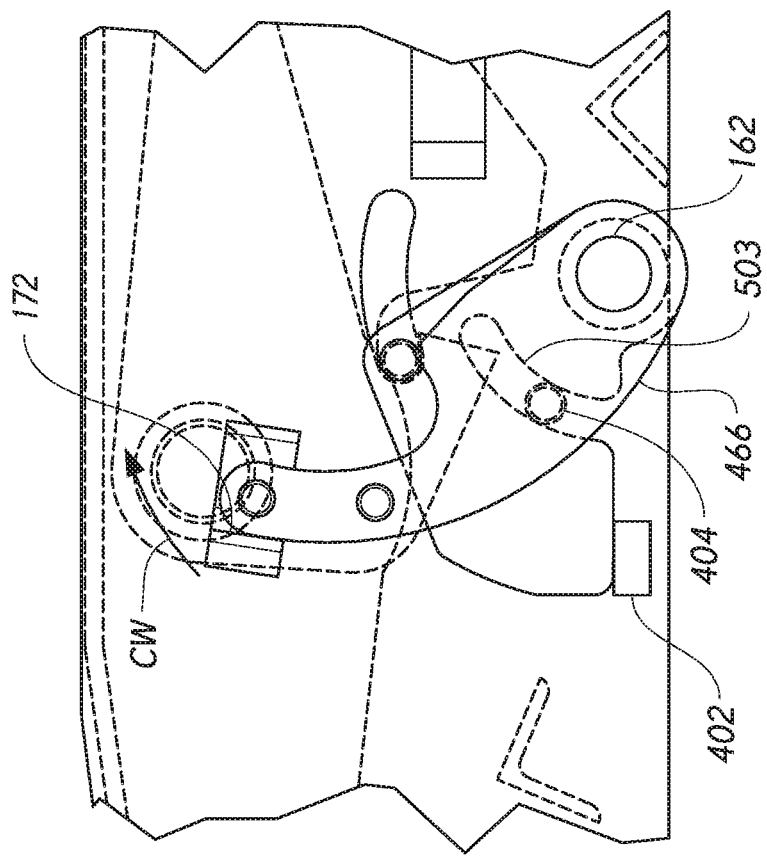

In general, operation of the vehicle restraint 400 is identical to operation of the vehicle restraint 100 described above, with the following exceptions related to operation of the main arm hold down mechanism 490. FIGS. 9A-9G are a series of side views of a portion of the vehicle restraint 400 illustrating operation of the hold down mechanism 490 in accordance with an embodiment of the present technology. In FIGS. 9A-9C, the second pivot arm 466, the break-away lever 164, the actuator 156 and the collapsible strut 160 have been omitted for clarity, but the second pivot arm 466 has been included in FIGS. 9D-9G for purposes of illustration. Referring first to FIGS. 9A-9C in combination with FIG. 4, in operation the hook assembly 124 is disengaged from the RIG 310 in the same manner described in detail above with reference to FIGS. 3A-3F except that as the main arm 419 moves downwardly into the housing 410 as shown in FIGS. 9A and 9B, the contact surface 806 of the engagement slot 802 comes into contact with the engagement pin 422 of the restraining member 420. Normally the restraining member 420 is biased against the stop block 402 by a counterweight and/or a torsional biasing member (e.g., a torsion spring). However, when the contact surface 806 contacts the engagement pin 422, it causes the engagement pin 422 to move upwardly in the engagement slot 802 and rotates the restraining member 420 away from the stop block 402 in the CW direction about the pivot shaft 162. As the main arm 419 continues moving downwardly, the engagement pin 422 continues moving upwardly relative to the engagement slot 802 until it drops into the notch 804 as show in FIG. 9C. In this position, the restraining member 420 holds the main arm 419 down in the fully stored position.

Figure 9E:
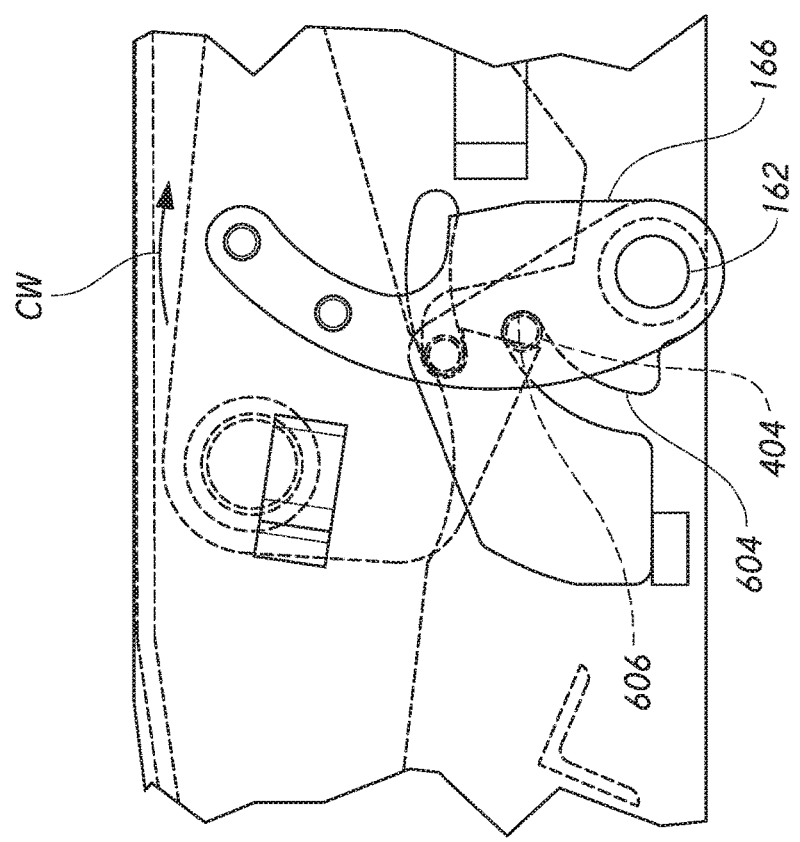
Figure 9F:
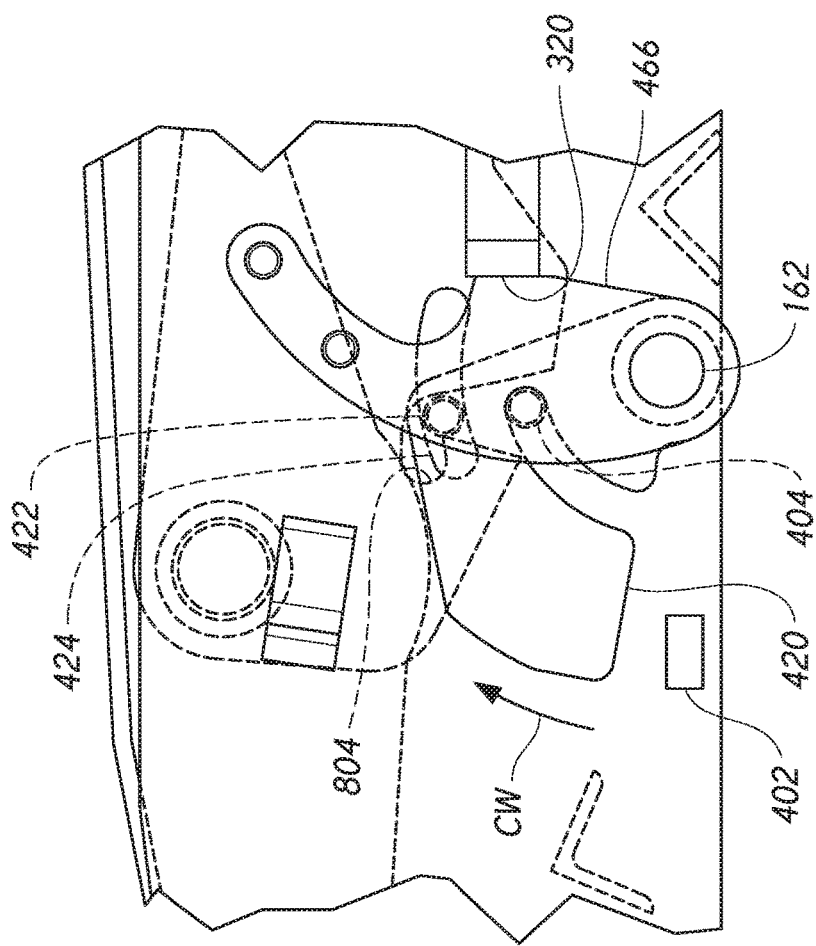
Figure 9G:
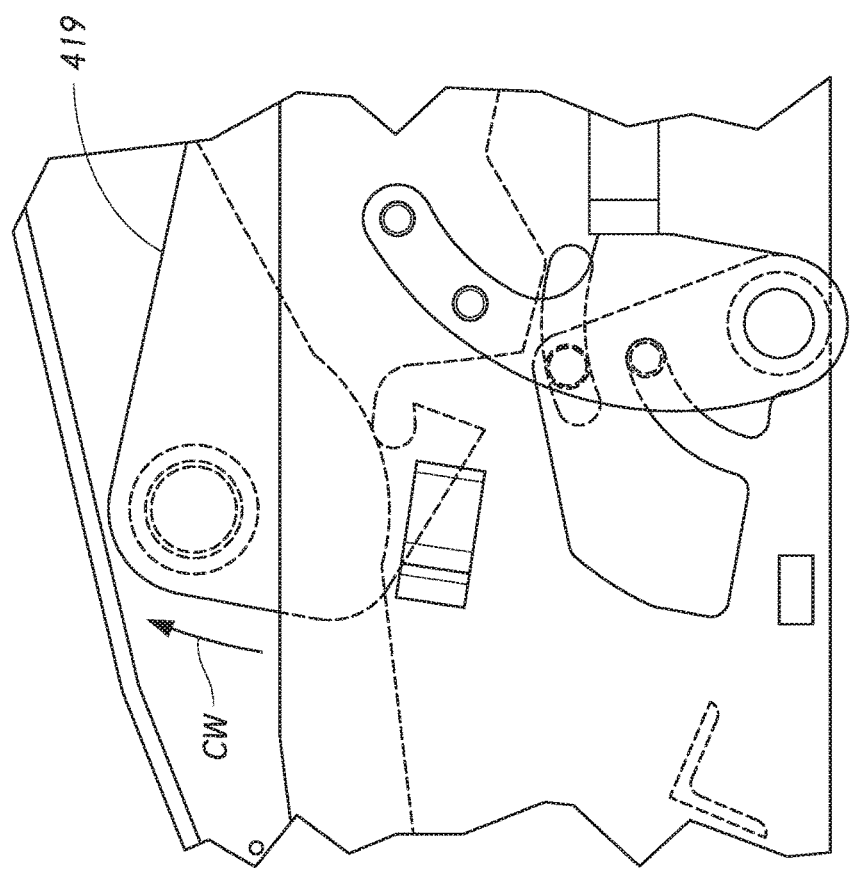

Raising the vehicle restraint 400 for engagement with the vehicle RIG 310 is described below with reference to FIGS. 9D-9G in conjunction with FIGS. 4 and 3F. Although FIG. 3F illustrates the vehicle restraint 100 and not the vehicle restraint 400, FIG. 3F will be referred to herein to facilitate an understanding of the operation of the vehicle restraint 400. To raise the vehicle restraint 400 and engage the RIG 310, the actuator 156 is retracted from the position shown in FIG. 3F. More specifically, an operator (e.g., a dock operator) can provide an engage command to the controller 184 via the control panel 185 (FIG. 1) and/or other user interface. The controller 184 can in turn energize the actuator 156 for retraction. As the actuator 156 retracts, the first end 180 moves to the left and rotates the first pivot arm 444 in the CW direction about the pivot pin 142 until the tension in the biasing member 403 counterbalances the force of the actuator 156. When this occurs, the first end 180 of the actuator 156 stops moving to the left, and the second end 182 begins moving to the right, which in turn causes the second pivot arm 466 to rotate away from the actuator stop 172 in the CW direction about the pivot shaft 162. This action enables the first pivot arm 444 to rotate back in the CCW direction until the first hook feature 151 on the lever 450 (FIG. 5) comes into contact with the main arm pin 154 (see, e.g., FIG. 3F). This stops CCW rotation of the first pivot arm 444, and continued retraction of the actuator 156 causes the second pivot arm 466 to continue rotating in the CW direction until the catch pin 404 (FIG. 4) comes into contact with the end portion 606 of the arcuate slot 604 in the restraining member 420 (FIG. 6) as shown in FIG. 9E. At this time, the engagement pin 422 on the restraining member 420 is still engaged with the notch 804 in the main arm 419 as shown in FIG. 9C, thereby holding the main arm 419 down in the fully stored position. Contact of the catch pin 404 with the end portion 606 of the arcuate slot 604 as shown in FIG. 9E temporarily halts CW rotation of the second pivot arm 466. As a result, continued retraction of the actuator 156 causes the first pivot arm 444 to rotate in the CW direction about the pivot pin 142 until the second hook feature 553 on the lever 450 (FIG. 5) comes into contact with the main arm pin 154. This contact momentarily stops the CW rotation of the first pivot arm 444, and continued retraction of the actuator 156 now causes the second pivot arm 466 to continue rotating in the CW direction about the pivot shaft 162, thereby driving the restraining member 420 away from the stop block 402 in the CW direction by means of the catch pin 404, as shown in FIG. 9F. As the restraining member 420 rotates in the CW direction, the engagement pin 422 begins moving from left to right in the arcuate slot 424 in the second side plate 412b of the housing 410 (FIG. 7), as also shown in FIG. 9F. Additionally, as the engagement pin 422 moves in this direction, it moves out of the notch 804 in the second arm member 818b (FIG. 8), as further shown in FIG. 9F. This enables the main arm 419 to rotate upwardly and out of the housing 410 in the CW direction under the force of the biasing members 130, as shown in FIG. 9G to bring the hook assembly 124 into engagement with the RIG 310.

As described above, the hold down mechanism 490 prevents the main arm 419 from rotating upwardly from the stored position until the second pivot arm 466 has rotated fully in the CW direction into contact with the forward stop 320. As a result, the second pivot arm 466 does not prevent the lower link 264 of the collapsible strut 160 from rotating CW once the main arm 419 starts to rise. This enables the biasing member 282 to hold the collapsible strut 160 in the rigid, over-center position throughout the entire upward motion of the hook assembly 124. As a result, the hook assembly 124 only moves in a straight, vertical direction to engage the RIG 310. This can prevent the binding and/or incomplete engagement that might otherwise occur if the collapsible strut 160 maintained a slightly collapsed configuration that caused the hook assembly 124 to move a slight arc during RIG engagement.

One advantage of some embodiments of the vehicle restraint described above over existing blocking-style vehicle restraints is that the forward and/or downward movement of the hook assembly 124 provided by the collapsible strut 160 can eliminate or at least greatly reduce the operational difficulties associated with hook-pinch. More specifically, whereas conventional vehicle restraints may require communication between the dock operator and the vehicle operator so that the vehicle operator can back the shipping vehicle against the loading dock (e.g., "bump-back") to alleviate hook-pinch and enable the restraint to be retracted, embodiments of the vehicle restraint described above can eliminate the need for such communication and coordination. Moreover, reducing the operating loads on the vehicle restraint often caused by hook-pinch can significantly reduce the operational damage that vehicle restraints sustain, thereby reducing the frequency maintenance and/or necessary repairs.

Although the collapsible strut 160 of the illustrated embodiment includes the collapsible links 262 and 264, in other embodiments, other types of collapsible struts and/or collapsible members are contemplated for use with vehicle restraints configured in accordance with the present technology. For example, in other embodiments the collapsible strut 160 can be replaced with, for example, an axially extensible member (e.g., a telescoping member) that can maintain a preset length during raising and engagement of the hook assembly 124, but can then be telescopically retracted or otherwise collapsed in response to, for example, a release command. For example, in one embodiment the collapsible strut 160 could be replaced by a hydraulic, pneumatic, or electrical actuator that maintains a given length during raising and engagement of the hook assembly 124, but then receives an appropriate signal (e.g., an electrical signal) causing, for example, a valve to open in the case of the hydraulic or pneumatic actuator, or an electrical stepper motor to operate, to thereby retract the telescoping member to release the hook assembly 124. Accordingly, as those of ordinary skill in the art will appreciate, restraint systems configured in accordance with the present technology can include various types of collapsible or otherwise retractable structures in place of and/or in addition to the collapsible strut 160.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above.

While specific examples for the invention are described above for illustrative purposes, various equivalent modifications are possible within the scope of the invention, as those skilled in the relevant art will recognize. For example, while operations of disclosed devices may be presented in a given order, alternative implementations may perform operations in a different order, and/or some operations may be deleted, moved, added, subdivided, combined, and/or modified to provide alternative or sub-combinations. The teachings of the technology provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A vehicle restraint comprising:
    a frame mountable relative to a dock face;
    a restraining structure configured to engage a vehicle; and
    a linkage operably coupling the restraining structure to the frame, wherein the linkage includes—
        a collapsible strut operably coupled between the frame and the restraining structure, wherein the collapsible strut includes a first link pivotally coupled to a second link by a joint therebetween; and
        an arm having a first end portion pivotally coupled to the restraining structure and a second end portion pivotably coupled to the collapsible strut, wherein the linkage is operable to engage the restraining structure with the vehicle to prevent the vehicle from moving away from the dock face, and wherein the linkage is further operable to disengage the restraining structure from the vehicle by rotation of at least one of the first link or the second link toward the other of the first link or the second link about the joint.

2. The vehicle restraint of claim 1 wherein rotating at least one of the first link or the second link toward the other of the first link or the second link about the joint reduces an overall length of the collapsible strut.

3. The vehicle restraint of claim 1 wherein the collapsible strut further includes a link stop configured to prevent the first link from rotating toward the second link about the joint in a first direction, while permitting the first link to rotate toward the second link in a second direction opposite to the first direction.

4. The vehicle restraint of claim 1 wherein the collapsible strut further includes:
    a link stop configured to prevent the first link from rotating toward the second link about the joint in a first direction, while permitting the first link to rotate toward the second link in a second direction opposite to the first direction; and
    a biasing member biasing the first link toward the link stop.

5. The vehicle restraint of claim 1, further comprising means for biasing the linkage in an upward position.

6. The vehicle restraint of claim 1, further comprising an actuator operably coupled between the frame and the collapsible strut, wherein the actuator is operable to disengage the restraining structure from the vehicle by rotating at least one of the first link or the second link toward the other of the first link or the second link about the joint, and wherein the actuator is further operable to move the linkage toward a stored position.

7. The vehicle restraint of claim 1, further comprising a linear actuator operably coupled between the frame and the collapsible strut, wherein extension of the actuator is operable to disengage the restraining structure from the vehicle by rotating at least one of the first link or the second link toward the other of the first link or the second link about the joint, and wherein further extension of the actuator is operable to move the linkage toward a stored position.

8. A vehicle restraint comprising:
    a frame mountable relative to a dock face;
    a restraining structure configured to engage a vehicle; and
    a linkage operably coupling the restraining structure to the frame, wherein the linkage includes—
        a collapsible strut operably coupled between the frame and the restraining structure, wherein the collapsible strut includes a first link pivotally coupled to a second link by a joint therebetween, wherein the linkage is operable to engage the restraining structure with the vehicle to prevent the vehicle from moving away from the dock face, and wherein the linkage is further operable to disengage the restraining structure from the vehicle by rotation of at least one of the first link or the second link toward the other of the first link or the second link about the joint;
        a first arm having a proximal end portion pivotally coupled to the frame; and a second arm pivotally coupled to a distal end portion of the first arm and operably extending between the collapsible strut and the restraining structure.

9. The vehicle restraint of claim 8, further comprising one or more biasing members operably coupled between the frame and the first arm to bias the linkage toward an upward position.

10. The vehicle restraint of claim 8 wherein the second arm has a first end portion pivotally coupled to the strut and a second end portion pivotally coupled to the restraining structure, and wherein the distal end portion of the first arm is pivotally coupled to the second arm between the first and second end portions.

11. The vehicle restraint of claim 8, further comprising an actuator operably coupled between the first arm and the collapsible strut, wherein the actuator is operable to rotate the at least one of the first link or the second link toward the other of the first link or the second link about the joint therebetween to disengage the restraining structure from the vehicle, and wherein the actuator is further operable to rotate the first arm downwardly and move the linkage toward a lowered position.

12. The vehicle restraint of claim 8, further comprising an actuator having a first end portion operably coupled to a first pivot arm and a second end portion operably coupled to a second pivot arm, wherein extension of the actuator operably engages the second pivot arm with the collapsible strut and rotates the at least one of the first link or the second link toward the other of the first link or the second link about the joint therebetween to disengage the restraining structure from the vehicle, and wherein further extension of the actuator operably engages the sfirst pivot arm with the first arm to rotate the first arm downwardly and move the linkage toward a lowered position.

13. A vehicle restraint comprising:
   a frame mountable relative to a dock face;
   a restraining structure configured to engage a vehicle; and
   a linkage operable to move the restraining structure into engagement with the vehicle to prevent the vehicle from moving away from the dock face, wherein the linkage includes—
      a first arm having a proximal end portion pivotally coupled to the frame proximate the dock face;
      a second arm pivotally coupled to a distal end portion of the first arm, the second arm having a first end portion operably coupled to the restraining structure and a second end portion spaced apart from the first end portion; and
      a strut having a proximal end portion operably coupled to the frame and a distal end portion operably coupled to the second end portion of the second arm, wherein the linkage is further operable to disengage the restraining structure from the vehicle by movement of the strut from an extended position in which the distal end portion of the strut is spaced apart from the proximal end portion of the strut by a first distance, to a retracted position in which the distal end portion of the strut is spaced apart from the proximal end portion of the strut by a second distance that is less than the first distance.

14. The vehicle restraint of claim 13 wherein moving the strut from the extended position to the retracted position includes rotating at least a first portion of the strut relative to a second portion of the strut.

15. The vehicle restraint of claim 13, further comprising one or more biasing members operably coupled between the frame and the first arm to bias the linkage toward an upward position.

16. The vehicle restraint of claim 13, further comprising an actuator operably coupled between the first arm and the strut, wherein the actuator is operable to move the strut from the extended position to the retracted position to disengage the restraining structure from the vehicle, and wherein the actuator is further operable to rotate the first arm downwardly and move the linkage toward a lowered position.

17. The vehicle restraint of claim 13, further comprising:
   a first pivot arm pivotally mounted relative to the frame and operable to move the first arm;
   a second pivot arm pivotally mounted relative to the frame and operable to move the strut; and
   an actuator having a first end portion operably coupled to the first pivot arm and a second end portion operably coupled to the second pivot arm, wherein extension of the actuator operably engages the second pivot arm with the strut and moves the strut from the extended position to the retracted position to disengage the restraining structure from the vehicle, and wherein further extension of the actuator operably engages the first pivot arm with the first arm to rotate the first arm downwardly and move the linkage toward a lowered position.

18. The vehicle restraint of claim 13, further comprising means for attaching the frame to the dock face.

19. The vehicle restraint of claim 13 wherein the restraining structure includes a hook configured to engage a rear bar on the vehicle.

20. The vehicle restraint of claim 13, wherein the linkage is operable to move the restraining structure from a fully stored position to a fully engaged position in which the restraining structure is fully engaged with the vehicle to prevent the vehicle from moving away from the dock face, and wherein strut remains in the extended position throughout the entire movement of the restraining structure from the fully stored position to the fully engaged position.

\* \* \* \* \*